United States Patent
Pruszko et al.

(10) Patent No.: US 6,173,840 B1
(45) Date of Patent: Jan. 16, 2001

(54) BENEFICIATION OF SALINE MINERALS

(75) Inventors: Rudolph Pruszko, Green River, WY (US); Roland Schmidt, Lakewood; Dale Lee Denham, Jr., Arvada, both of CO (US)

(73) Assignee: Environmental Projects, Inc., Casper, WY (US)

( * ) Notice: Under 35 U.S.C. 154(b), the term of this patent shall be extended for 0 days.

(21) Appl. No.: 09/027,043

(22) Filed: Feb. 20, 1998

Related U.S. Application Data

(60) Provisional application No. 60/038,759, filed on Feb. 21, 1997.

(51) Int. Cl.[7] ................ B03C 1/00; B07B 1/00; B03B 1/00

(52) U.S. Cl. ............... 209/214; 209/3; 209/218; 209/11

(58) Field of Search .............. 209/3, 4, 7, 9, 209/10, 11, 214, 218, 223.1, 225, 226, 227, 908

(56) References Cited

U.S. PATENT DOCUMENTS

| | | |
|---|---|---|
| 1,371,825 | 3/1921 | Uhlig . |
| 2,708,034 | 5/1955 | Koren ................... 209/223 |
| 2,990,124 | 6/1961 | Cavanagh et al. ............ 241/24 |
| 3,022,956 | 2/1962 | Haseman ................... 241/24 |
| 3,246,753 * | 4/1966 | Laurila .................. 209/214 |
| 3,276,581 | 10/1966 | Mayer et al. ............ 209/111.8 |
| 3,382,977 * | 5/1968 | Fraas ................... 209/214 |
| 3,528,766 * | 9/1970 | Coglaiti ................. 209/12.2 |
| 3,655,331 * | 4/1972 | Seglin et al. .............. 23/63 |
| 3,860,514 | 1/1975 | Lee et al. ................. 209/8 |
| 3,869,538 * | 3/1975 | Sproul et al. ............ 423/206.2 |
| 3,936,372 * | 2/1976 | Frangiskos ............... 209/3 |
| 3,966,590 | 6/1976 | Boom et al. .............. 209/39 |
| 3,990,642 * | 11/1976 | Nott ..................... 209/214 |
| 4,054,513 * | 10/1977 | Windle ................. 209/223.1 |
| 4,214,984 * | 7/1980 | MacElvain .............. 209/214 |
| 4,236,640 | 12/1980 | Knight .................. 209/587 |
| 4,277,329 * | 7/1981 | Cavanagh .............. 209/223.1 |
| 4,294,690 * | 10/1981 | Kollenz ................. 209/214 |
| 4,324,577 * | 4/1982 | Sepehri-Nik ............. 209/214 |
| 4,341,744 * | 7/1982 | Brison .................. 423/206 |
| 4,363,722 | 12/1982 | Dresty, Jr. et al. ........... 209/3 |
| 4,375,407 * | 3/1983 | Kronick ................... 209/8 |
| 4,375,454 * | 3/1983 | Imperto et al. ............ 209/214 |
| 4,388,179 | 6/1983 | Lewis ................... 208/177 |
| 4,512,879 | 4/1985 | Attia et al. ................ 209/3 |
| 4,609,109 * | 9/1986 | Good .................. 209/223.1 |
| 4,668,591 * | 5/1987 | Minemura et al. ......... 209/223.1 |
| 4,737,294 * | 4/1988 | Kukuck ................ 209/223.1 |
| 4,772,383 * | 9/1988 | Christensen ............. 209/223.1 |
| 4,781,298 * | 11/1988 | Hemstock et al. ........... 209/214 |
| 4,814,151 * | 3/1989 | Benke ................... 423/206 |
| 4,874,508 | 10/1989 | Fritz ................... 209/214 |
| 4,902,428 * | 2/1990 | Cohen .................. 209/214 |
| 4,943,368 | 7/1990 | Gilbert et al. ............... 209/2 |
| 5,238,664 * | 8/1993 | Frint et al. .............. 423/206.2 |

(List continued on next page.)

Primary Examiner—Donald P. Walsh
Assistant Examiner—Daniel K Schlak
(74) Attorney, Agent, or Firm—Sheridan Ross P.C.

(57) ABSTRACT

Processes for purification of saline minerals using magnetic separation are disclosed. In particular, saline minerals can include trona, borates, potash, sulfates, nitrates and chlorides. The magnetic separation can include high intensity magnetic separation which can be conducted at greater than about 20,000 Gauss and up to greater than about 50,000 Gauss. Other embodiments of the invention include calcination of a saline mineral in an inert atmosphere or in an oxygen-containing atmosphere at a high temperature prior to magnetic separation. A further embodiment of the invention includes pre-alignment of particles on a surface to align the particles of high magnetic force during a magnetic separation step. Also disclosed are various embodiments of magnetic separation which include subjecting an ore to a preliminary magnetic field prior to magnetic separation.

8 Claims, 9 Drawing Sheets

U.S. PATENT DOCUMENTS 5,470,554 * 11/1995 Schmidt et al. .................. 423/206.2
5,651,465 * 7/1997 Schmidt et al. .................... 209/12.2
5,736,113 * 4/1998 Hazen et al. ...................... 423/206.2
5,911,959 * 6/1999 Wold et al. ....................... 423/206.2

* cited by examiner

BENEFICIATION OF SALINE MINERALS

CROSS-REFERENCE TO RELATED APPLICATIONS

This application claims priority from U.S. Provisional Application Ser. No. 60/038,759, filed Feb. 21, 1997, entitled "BENEFICIATION OF SALINE MINERALS."

FIELD OF THE INVENTION

The present invention relates to the beneficiation of saline minerals and, more specifically, trona, by methods of magnetic separation.

BACKGROUND OF THE INVENTION

Many saline minerals are recognized as being commercially valuable. For example, trona, borates, potash and chlorides are mined commercially. After mining, these minerals need to be beneficiated to remove naturally occurring impurities.

With regard to trona ($Na_2CO_3 \cdot NaHCO_3 \cdot 2H_2O$), high-purity trona is commonly used to make soda ash, which is used in the production of glass, paper and other goods. Naturally-occurring trona, or crude trona, is found in large deposits in the western United States, such as in Wyoming and California, and also in Egypt, Kenya, Botswana, Tibet, China, Venezuela and Turkey. The largest deposit of trona in the world is located in the Green River Basin in Wyoming. Crude trona ore from Wyoming is typically between about 80% and about 90% trona, with the remaining components including shortite, pyrite, quartz, dolomite, mudstone, oil shale, kerogen, mica, nahcolite and clay minerals.

Many areas of the glass and paper making industries require soda ash produced from trona having a purity of 99% or more. In order to obtain such a high purity, wet beneficiation processes have been used. Such processes generally involve crushing the crude trona, solubilizing the trona, treating the solution to remove insolubles and organic matter, crystallizing the trona, and drying the trona which may subsequently be calcined to produce soda ash. Alternatively, the crude trona can be calcined to yield crude sodium carbonate, which is then solubilized, treated to remove impurities, crystallized and dried to produce sodium carbonate monohydrate or calcined to produce soda ash. While the above-described wet processes can produce with high purity, they tend to be time consuming and expensive to perform, and therefore result in a product which is much more expensive than products produced using known dry processes.

Not all industries which use trona or soda ash require such a highly purified form. For example, certain grades of glass can be produced utilizing soda ash having less than 97% purity. For this purpose, U.S. Pat. No. 4,341,744 discloses a dry beneficiation process which is less complex and less expensive than the above-described wet beneficiation process. Such a dry beneficiation process generally includes crushing the crude trona, classifying the trona by particle size, electrostatically separating certain impurities, and optionally magnetically separating other impurities. Such a process can yield trona or soda ash having up to 95% to 97% purity with a 60–74% recovery, depending on the quantity and type of impurities present in the crude trona ore.

There are uses for trona or soda ash, for example in certain applications in the glass industry, requiring a purity of at least 97%, yet not needing a purity over 99%. To accomplish this, U.S. Pat. No. 5,470,554 discloses a dry method for beneficiating trona or soda ash that generally comprises the step of density separation, and optionally includes electrostatic separation and/or magnetic separation. U.S. Pat. No. 5,470,554 is incorporated herein by reference in its entirety. The resulting product can have trona or soda ash purities on the order of 97–98% or more. Although this process works quite satisfactorily, there is always a desire to reduce the number of steps, and thereby reduce the costs, associated with separation processes. In addition, there is always a desire to improve the recovery of beneficiation processes.

As such, it can be appreciated that it would be desirable to be able to beneficiate trona or soda ash utilizing a low cost dry beneficiation process to obtain trona or soda ash purities of about 97–98% or higher and recoveries on the order of 90–95%. Accordingly, it is an object of the present invention to provide a dry process for the beneficiation of trona or soda ash resulting in higher purities and lower costs than many existing dry beneficiation processes, and which is simpler and less expensive than known wet beneficiation processes.

SUMMARY OF THE INVENTION

One embodiment of the invention is a process for recovering a saline mineral from an ore which contains saline mineral and impurities. The method includes separating a first portion of impurities from the ore by magnetic separation which includes subjecting the ore to a magnetic flux density of greater than about 20,000 Gauss. In a preferred embodiment, the saline mineral selected from trona, borates, potash, sulfates, nitrates and chlorides, and most preferably is trona. In other embodiments, the process includes such a method of magnetic separation of impurities, wherein an impurity selected from shortite and pyrite are separated. In these embodiments, at least about 25% of the impurity and up to more than 75% of the impurity is removed.

In a further embodiment of the present invention, a process is provided for recovering saline mineral from an ore which includes saline mineral and impurities. The method includes calcining the saline mineral in an inert atmosphere and the separating a portion of the impurities from the ore by magnetic separation. In a preferred embodiment, the inert atmosphere is any nonoxygen-containing atmosphere and can be selected from carbon dioxide, nitrogen, and water vapor. In an alternative embodiment, calcination is conducted in an oxygen-containing atmosphere at a temperature of greater than about 150° C. and subsequently separating a portion of the impurities by magnetic separation. A further embodiment of the present invention includes a process for the purification of saline minerals in an ore which includes saline mineral and impurities by magnetic separation in a first magnetic field, wherein the first magnetic field has positions of higher intensity and lower intensity. The process includes pre-aligning the ore on a surface with respect to one or more of said positions of higher intensity of said first magnetic field before separation. The process further includes separating a portion of the impurities from the ore by magnetic separation in the first magnetic field.

In a further embodiment of the present invention, a process is provided for removing magnetic impurities from an ore which contains a saline mineral and magnetic impurities and has a particle size of less than 100 mesh. The process includes subjecting the ore to a magnetic flux density of greater than about 20,000 Gauss whereby magnetic impurities are separated from the saline mineral. This process can include recovering greater than about 25 wt. % of the magnetic impurities and up to greater than about 75 wt. % of the magnetic impurities.

DETAILED DESCRIPTION

Figure 1:
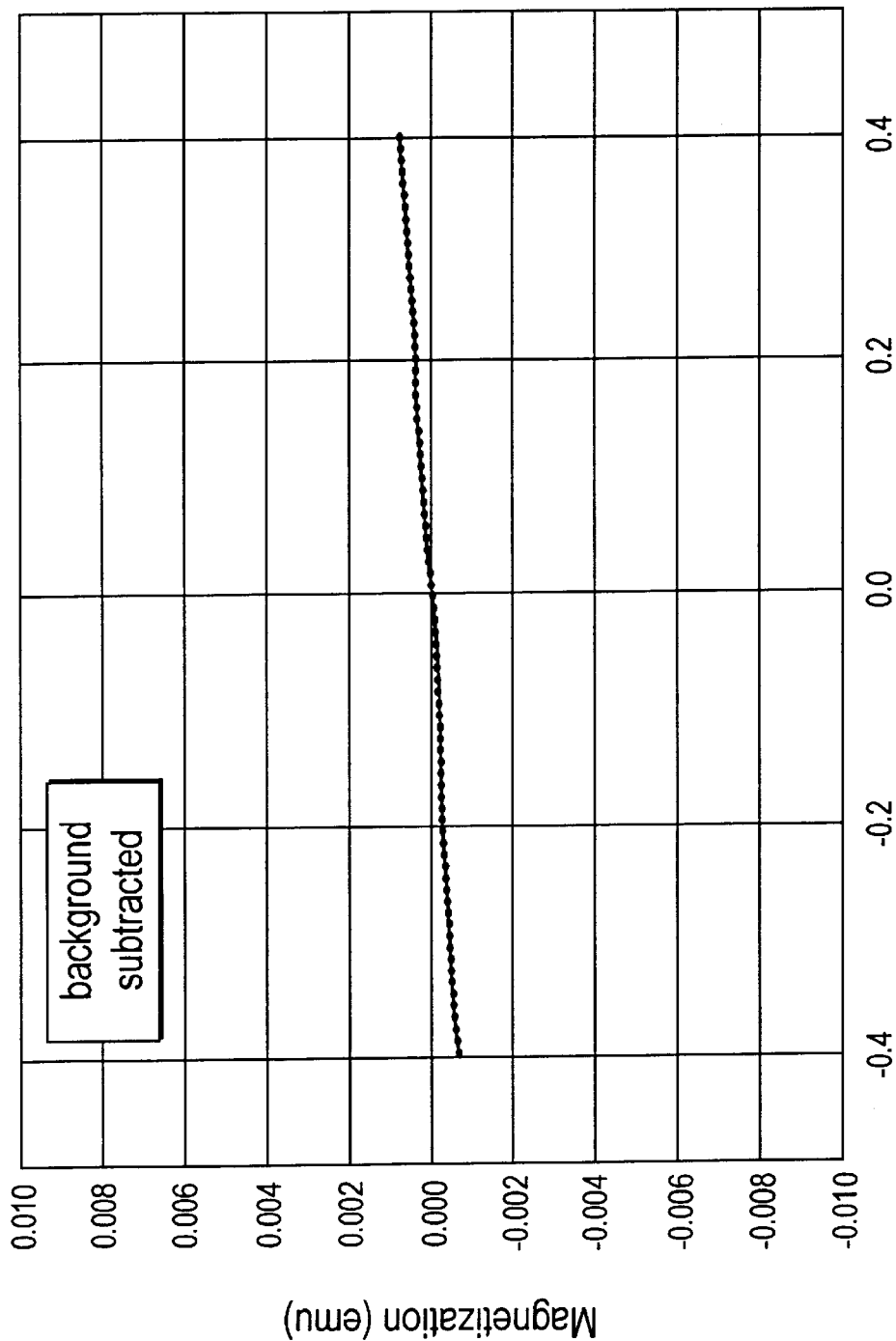
FIG. 1 is a graph of the magnetic properties of pyrite from trona calcined at low temperature.
Figure 2:
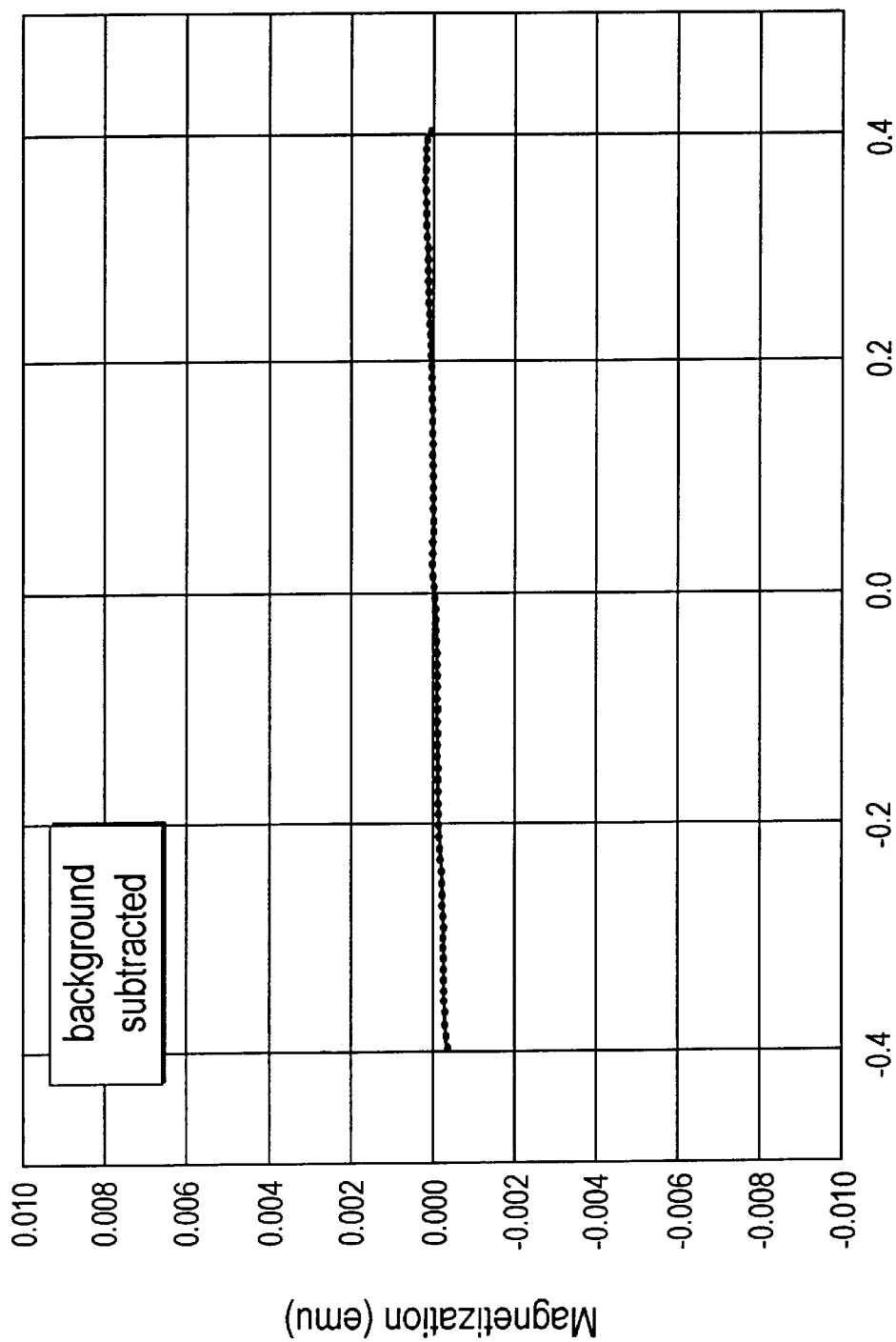
FIG. 2 is a graph of the magnetic properties of pyrite from trona calcined at low temperature and washed with hydrochloric acid.
Figure 3:
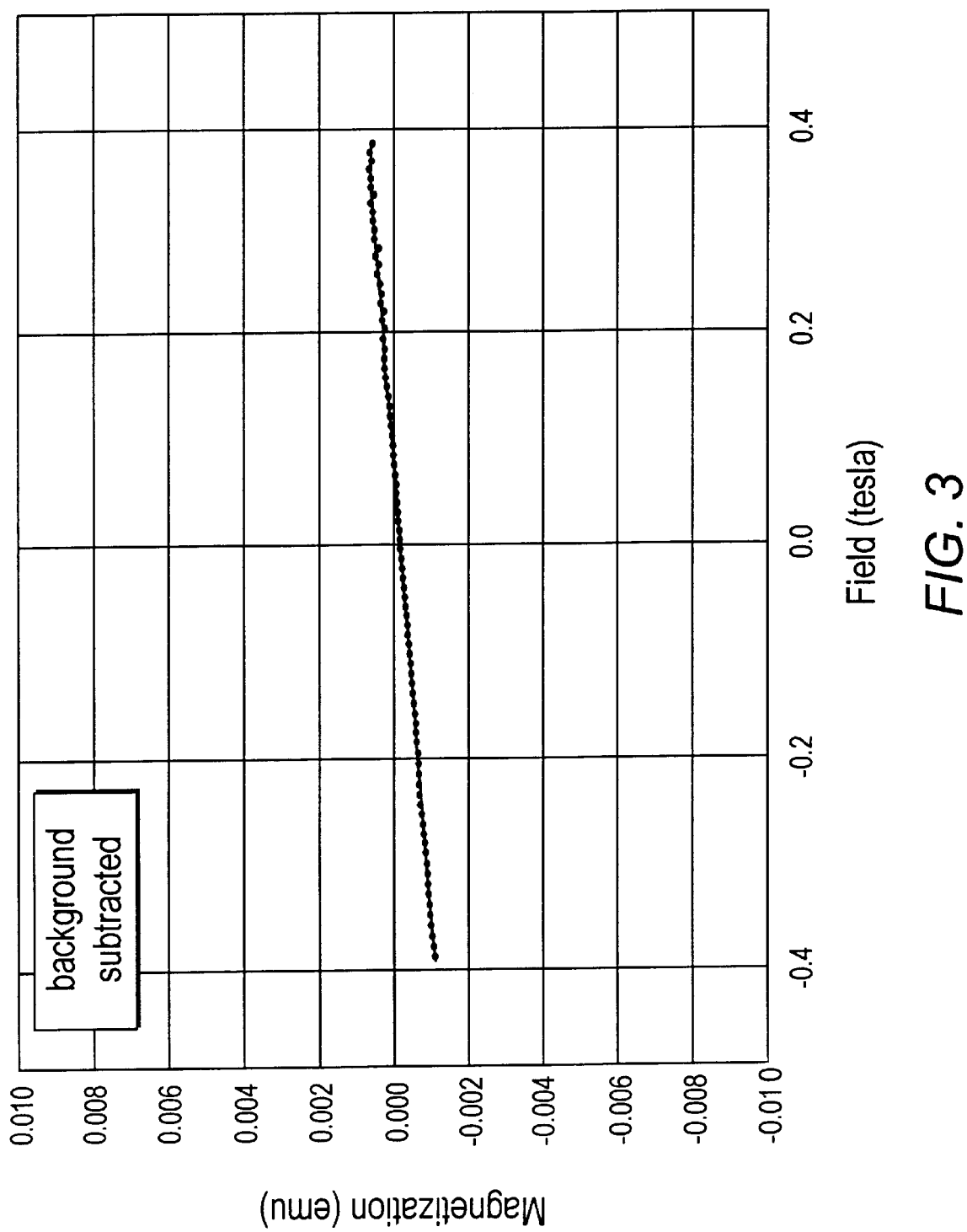
FIG. 3 is a graph of the magnetic properties of pyrite from uncalcined trona.
Figure 4:
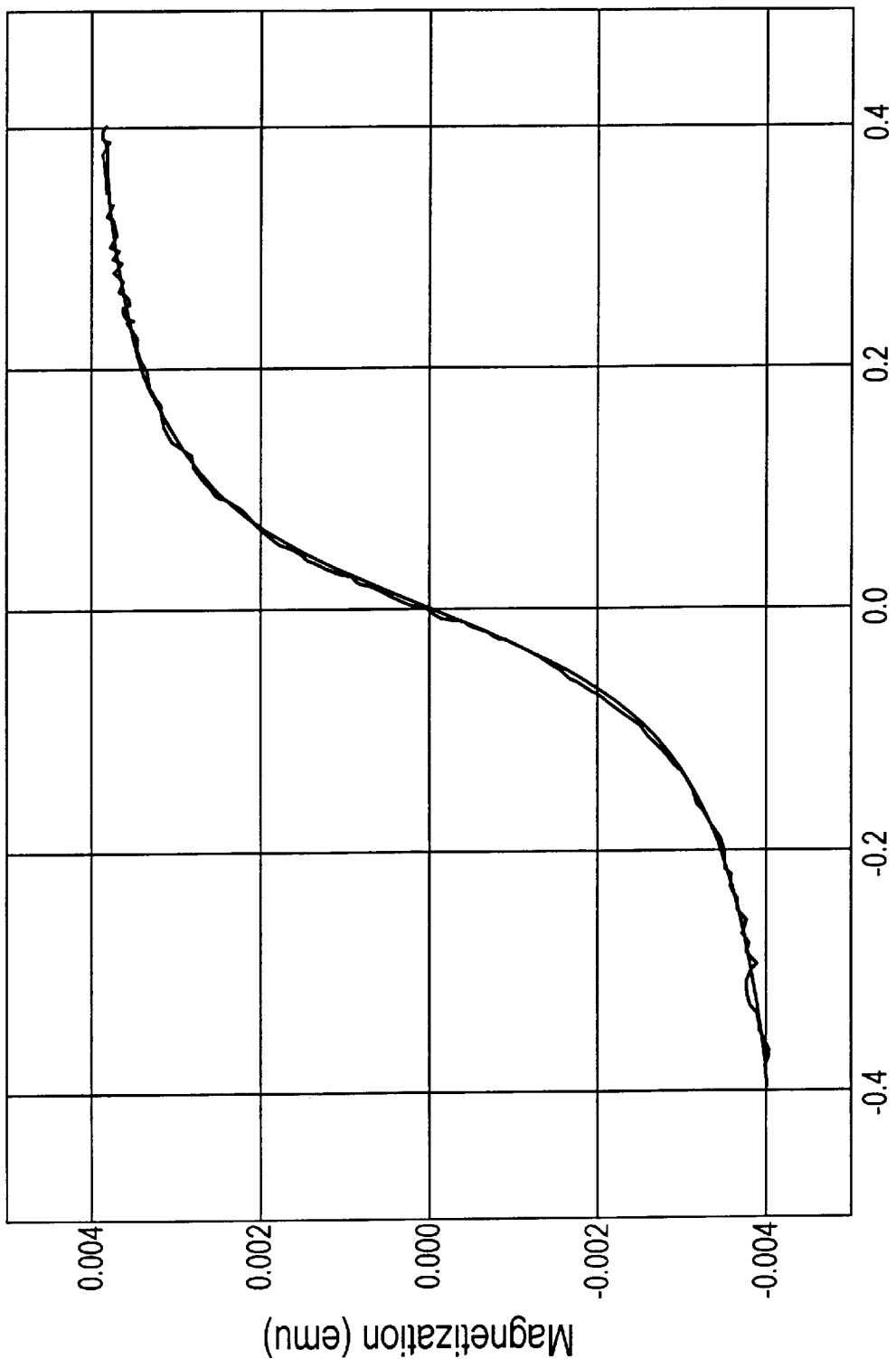
FIG. 4 is a graph of the magnetic properties of pyrite from an ore body other than trona from Climax, Colo.
Figure 5:
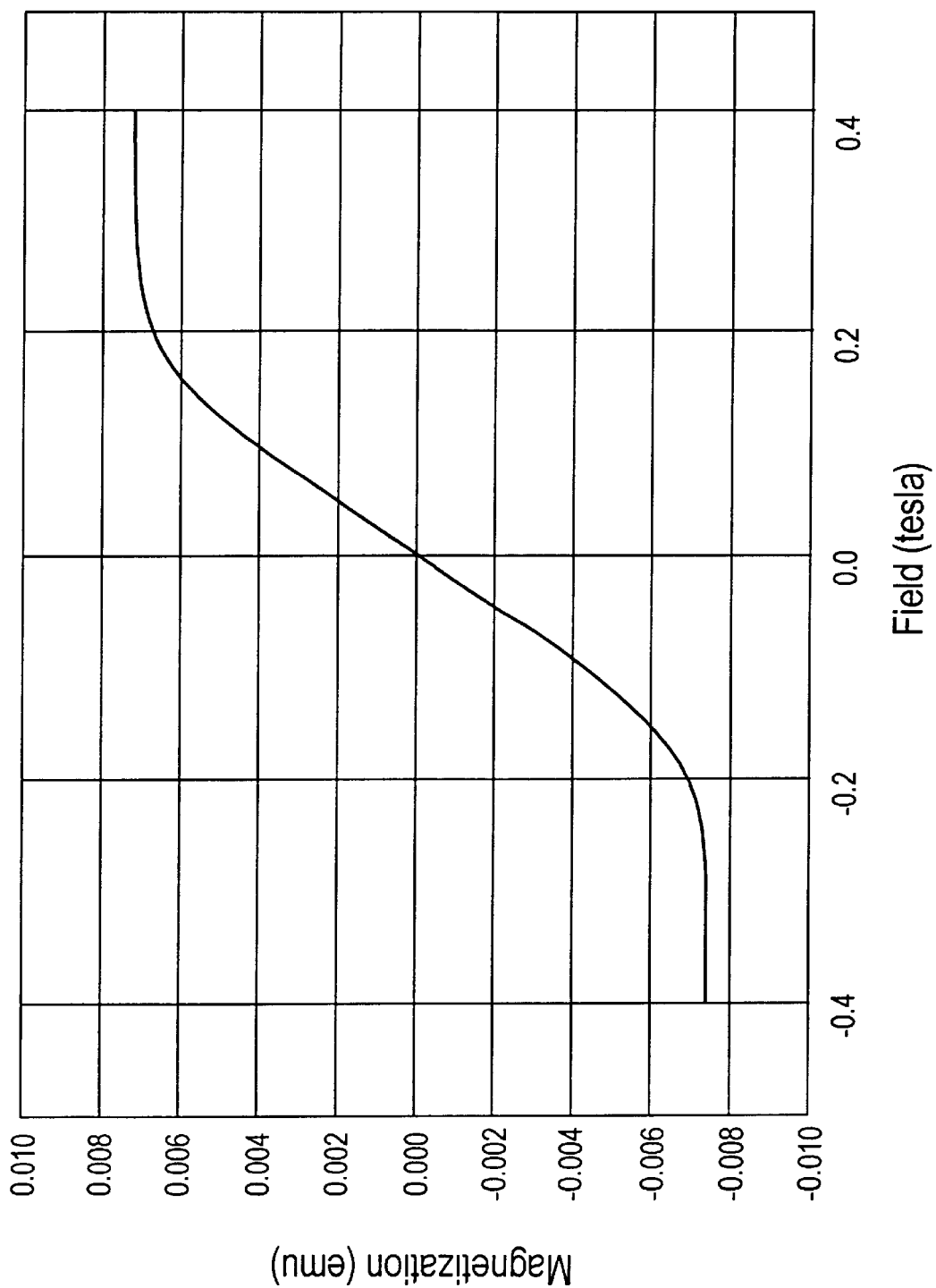
FIG. 5 is a graph of the magnetic properties of pyrite from an ore body other than trona from Vulcan, Colo.
Figure 6:
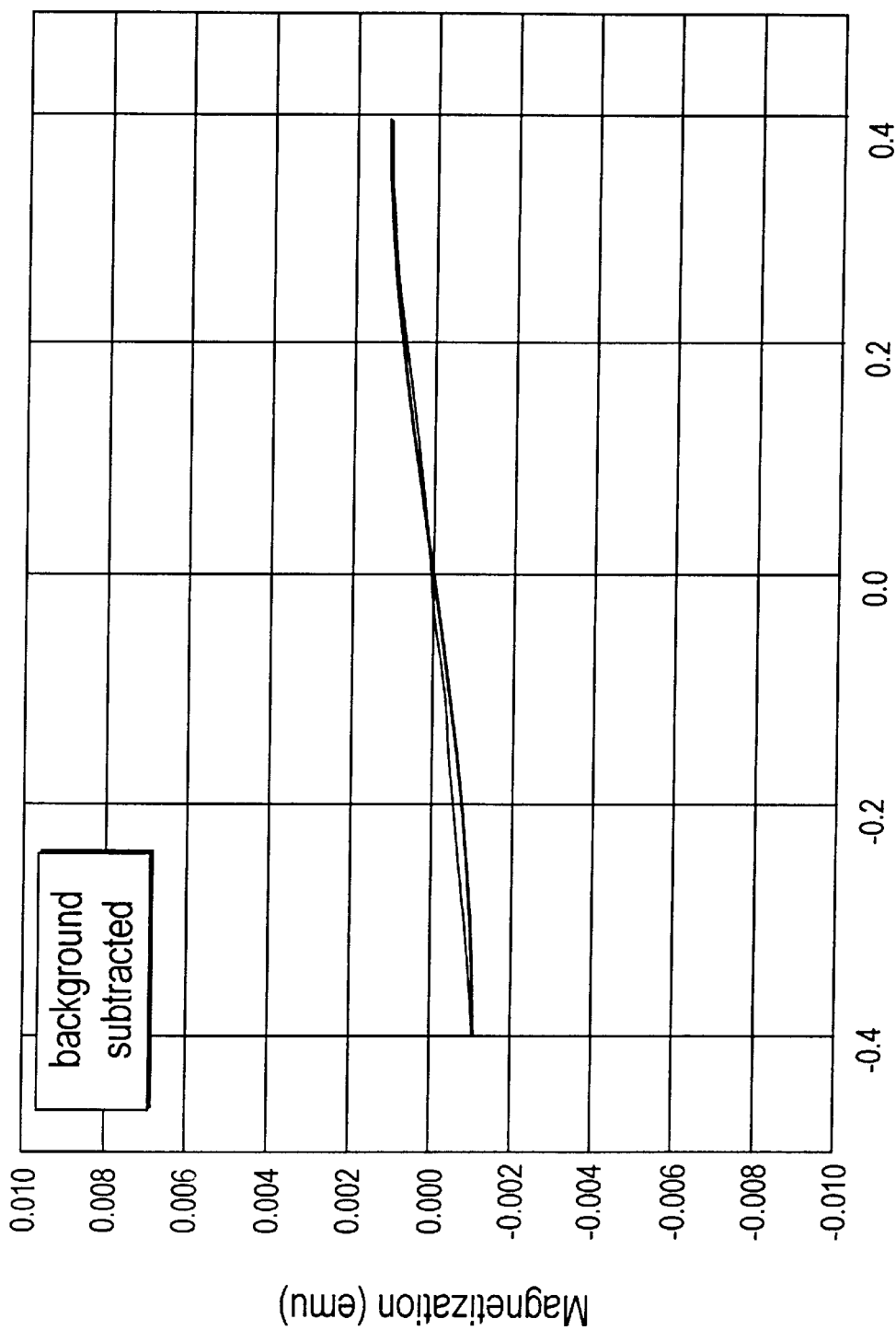
FIG. 6 is a graph of the magnetic properties of pyrite from an ore body other than trona in Argentina.
Figure 7:
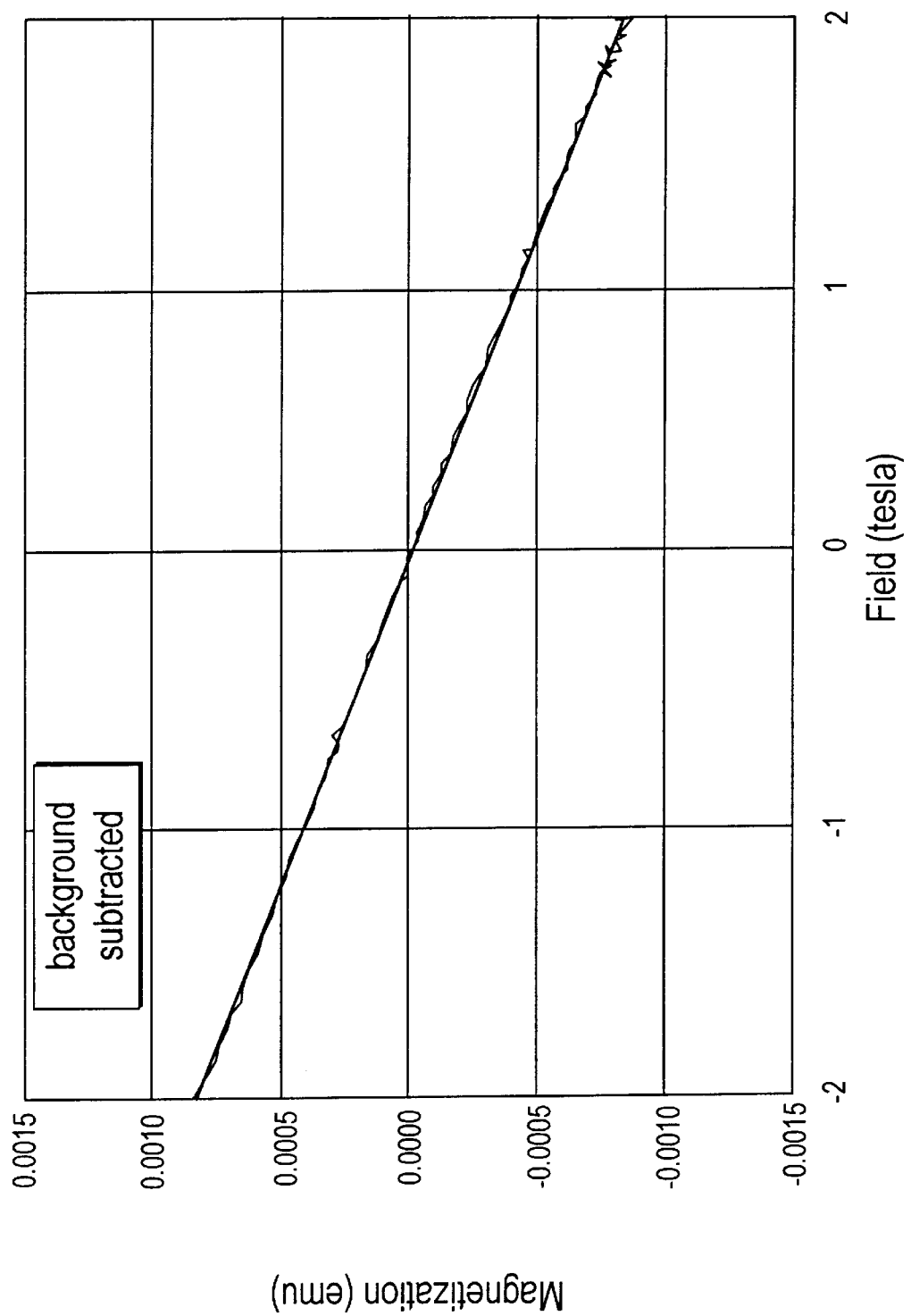
FIG. 7 is a graph of the magnetic properties of shortite from a non-magnetic fraction of uncalcined trona.
Figure 8:
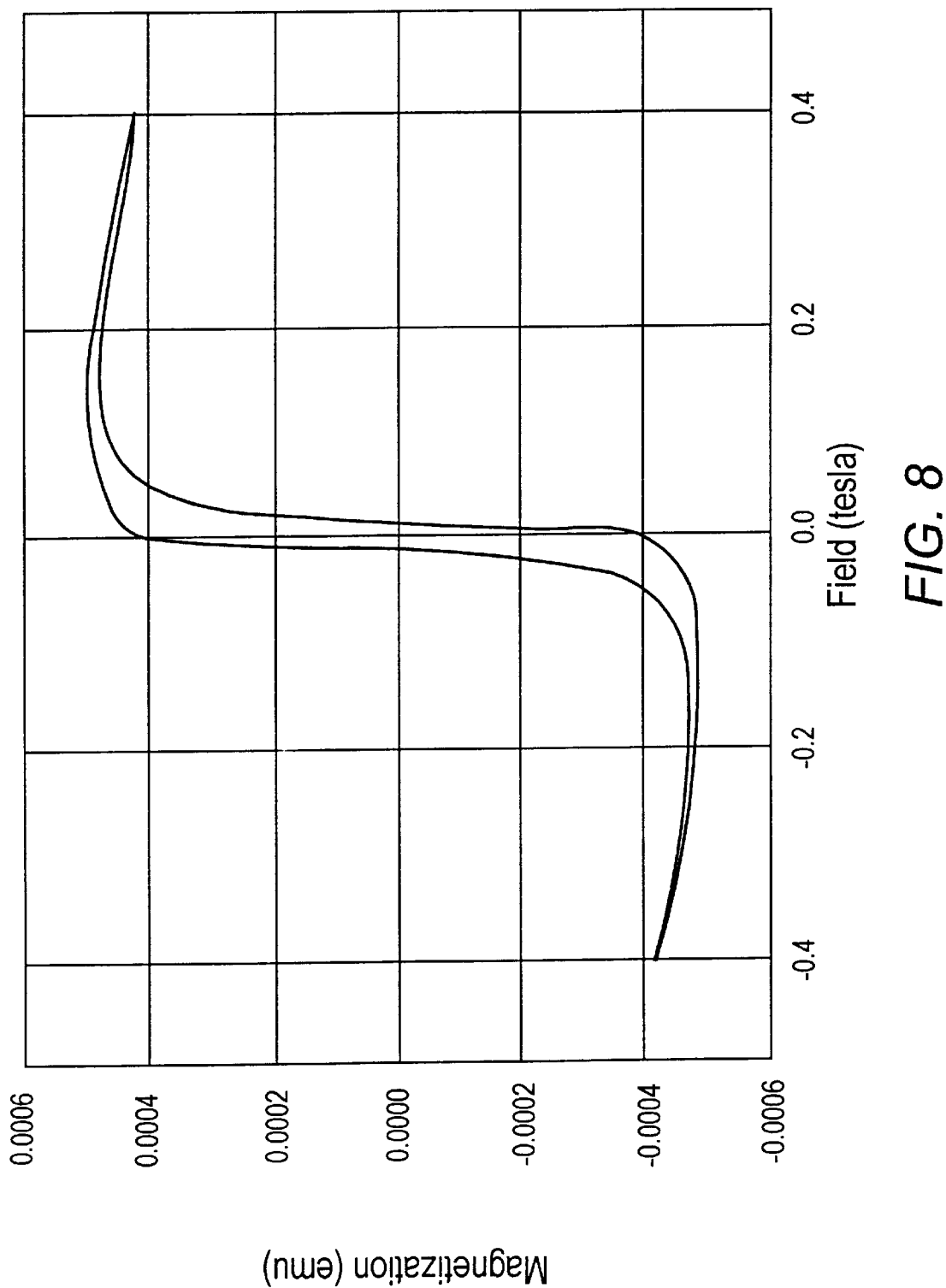
FIG. 8 is a graph of the magnetic properties of shortite from a magnetic fraction of uncalcined trona.

The present invention is a dry beneficiation process for recovering saline minerals from an ore containing the saline mineral and impurities, and takes advantage of previously unrecognized characteristics of such ore. As used herein and in the mineral processing industry, the term "saline mineral" refers generally to any mineral which occurs in evaporite deposits. Saline minerals that can be beneficiated by the present process include, without limitation, trona, borates, potash, sulfates, nitrates, chlorides, and preferably trona.

The purity of saline minerals within an ore depends on the deposit location, as well as on the area mined at a particular deposit. In addition, the mining technique used can significantly affect the purity of the saline minerals. For example, by selective mining, higher purities of saline minerals can be achieved. Regarding the saline mineral trona, deposits are located at several locations throughout the world, including Wyoming (Green River Basin), California (Searles Lake), Egypt, Kenya, Venezuela, Botswana, Tibet, China and Turkey (Beypazari Basin). For example, a sample of trona ore from Searles Lake has been found to have from about 50% to about 90% by weight (wt. %) trona and a sample taken from the Green River Basin in Wyoming has been found to have from about 70 wt. % to about 92 wt. % trona. The remaining 8 wt. % to 30 wt. % of the ore in the Green River Basin sample comprised impurities including shortite, pyrite, shale consisting predominantly of dolomite, clay, quartz and kerogen, and traces of other impurities. Other samples of trona ore can include different percentages of trona and impurities, as well as include other impurities.

Particular aspects of the present invention will be described in the context of the saline mineral trona. Such descriptions are not intended to limit the general applicability of the present invention to only trona. Moreover, as discussed herein, trona is often processed by calcination to produce soda ash ($Na_2CO_3$). It should be noted that, unless specifically indicated otherwise, use of the term trona herein can refer to both trona (i.e., $Na_2CO_3 \cdot NaHCO_3 \cdot 2H_2O$) and trona which has been processed by calcination to form soda ash. In addition, it should be recognized that descriptions of other processing steps herein (e.g., magnetic separation) should be construed to include processing of calcined and uncalcined trona. More particularly, it should be noted that, in preferred embodiments, calcined trona is used for magnetic separations and density separations described herein.

It has now been discovered that saline minerals, such as trona, do not have a constant distribution of impurities throughout the saline mineral particles. That is, crushed saline mineral ore particles have a variety of impurity contents ranging from no impurities in some particles to almost total impurities in other particles. It is believed that this characteristic of saline minerals was not previously recognized. Therefore, until the recognition of the present invention, there has been no suggestion or teaching to conduct aspects of the present process. It has been discovered that the impurities in saline mineral ores, such as trona containing ores, are typically concentrated in a relatively small percentage of the particles, while the rest of the saline mineral particles can be of relatively high purity. For example, under microscopic examination, most of the particles of crushed trona after calcination are almost completely white (i.e., substantially white), indicating highly pure trona, while others are distinctly yellowish-brown, indicating the presence of interstitial impurities. Such particles can be selectively separated (e.g., manually sorted) to yield a high purity fraction (e.g., about 97% or more saline mineral) and a low purity fraction (e.g., less than about 97% saline mineral).

It can be appreciated that, while the above-described manual sorting process produces a suitable product, the process can be impractical for high volume separation. The process of the present invention, however, includes all methods for selectively separating high and low purity products whether manual or automated. That is, more commercially-viable processes for separating the high purity saline mineral from the low purity saline mineral also fall within the scope of this invention. Thus, the process of the present invention includes a process for selectively separating a low purity fraction having more than about 3% impurity content from a high purity fraction having less than about 3% impurity content. Such separation is based upon differences in the properties of the particles at the level of impurities present in the particles.

In a preferred embodiment of the present invention, the step of separating impurities from an ore containing saline mineral and impurities includes the step of ultra-high magnetic separation. The ultra-high magnetic separation step subjects the ore to conditions such that materials of different magnetic susceptibilities (e.g., trona and shale) separate from each other into a recovered stream and an impurity stream. In accordance with the present invention, the ultra-high intensity of the magnetic flux during the magnetic separation step is at least about 20,000 Gauss, preferably at least about 30,000 Gauss, and more preferably at least about 50,000 Gauss. It should be noted that 10,000 Gauss is equivalent to 1 tesla and these units can be used interchangeably. Such ultra-high magnetic fluxes are in contrast to the above-described standard intensity magnetic separation at less than about 20,000 Gauss because such standard intensities are not sufficient to separate particles having both magnetic (e.g., shale) and non-magnetic (e.g., saline mineral) components. In order to generate such an ultra-high magnetic flux, superconducting electromagnetic field generators can be utilized. For example, an open gradient superconducting magnet can be used. It should be appreciated that other types of magnetic separators may be used, as long as the required ultra-high magnetic flux can be obtained. For example, it is recognized that some rare earth magnets can now achieve a magnetic flux of up to about 28,000 Gauss. With regard to the beneficiation of trona, typical impurities that can be removed during the magnetic separation step include shale and impure trona with interstitial dolomite and paramagnetic clay-type materials, which have higher magnetic susceptibilities than pure trona. In addition, other impurities may be separated by the present process due to their association with the magnetic impurities.

As noted, any type of high intensity magnetic separator is suitable for use in the present invention. More particularly, either dry or wet high intensity magnetic separators can be used. Dry separation refers to any process in which dry particles are subjected to a high intensity magnetic field for separation of magnetic impurities. Wet separation refers to any process in which magnetic impurities are separated from, e.g., crystals of a saline mineral in a saturated brine in a high intensity magnetic field. Alternatively, the wet medium can include other liquids, such as an alcohol.

Figure 9:
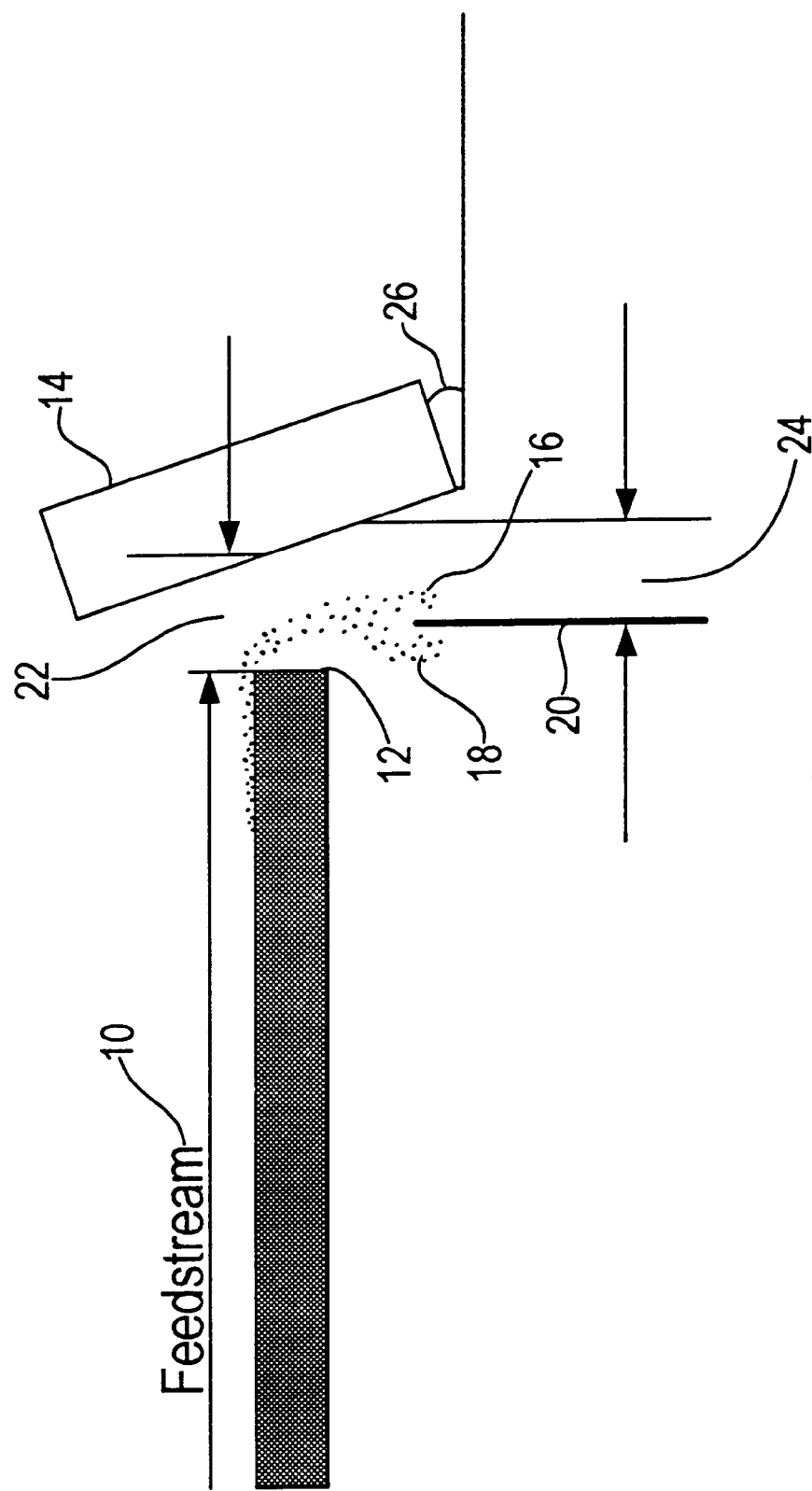
FIG. 9 is an illustration of a design for an open gradient magnetic separator.

Suitable high intensity magnetic separators can be of any known design. For example, magnetic separators can be of a type wherein a feedstream is fed in free fall in proximity to a high intensity magnet so that magnetic particles tend to migrate toward the magnet and non-magnetic particles do not. In this manner, as the particles are collected on either side of a splitter, the magnetic particles will physically separate from the non-magnetic particles. With particular regard to FIG. 9, a particular apparatus is illustrated. The feedstream 10 is fed to a dropoff point 12 in free fall. At the dropoff point 12, the feedstream is in close proximity to the magnet 14. As the feedstream 10 falls, the magnetic particles 16 migrate toward the magnet 14 and the non-magnetic particles 18 do not migrate toward the magnet 14. After the particles are separated and fall further toward the splitter 20, the magnetic particles 16 fall on one side of the splitter, while the non-magnetic particles 18 fall on the other side of the splitter 20. The horizontal distance between the dropoff point 12 and the magnet 14 defines the gap width 22. The horizontal distance between the splitter and a point on the magnet face which is closest to the arc of the feedstream defines the splitter gap width 24. The magnet angle 26 is defined by the angle between the bottom surface of the magnet and the horizontal. In an alternative high intensity magnetic separator design for dry separations, particles can be fed onto a matrix, such as a steel wool or wire mesh screen matrix in proximity to a high intensity magnet. Such a matrix can be made of any metal, such that in the presence of a magnetic flux, the metal can act as a magnet. The metal can be in any configuration having a high surface area such as a wool or screen. The magnetic particles in the feed stream will become attached to the matrix, whereas non-magnetic particles will migrate through the matrix and be removed from the bottom of the matrix. This apparatus design is particularly well suited for fine particles, such as feedstreams having a particle size of less than 100 mesh.

In a further apparatus design for use with wet high intensity magnetic separations, a matrix in a vessel filled with a liquid is provided. The matrix is subjected to the magnetic field of a high intensity magnet. The liquid can be, for example, a saturated brine solution of a saline mineral. For example, such a liquid can be from a saturated brine recrystallization process, such as is described in PCT application PCT/US96/00700, which is incorporated herein by reference in its entirety. Such a stream can include the entire size range of crystals generated by the process or can be generated by separating large crystals from insoluble impurities and smaller crystals on a size separation basis. The resulting stream of a saturated brine solution with insoluble impurities and small crystals can be treated by wet high intensity separation as described herein. Alternatively, water can be added to such a stream to dissolve the small crystals therein. In addition, the liquid medium can be an alcohol or other suitable medium.

In a further aspect of the present invention, it has been surprisingly found that during high intensity magnetic separation, as described above, impurities not previously recognized as being susceptible to magnetic separation can be separated. In one such embodiment, this process includes subjecting a saline mineral containing ore to high intensity magnetic separation, whereby the impurity shortite is separated from the saline mineral. In another such embodiment, the impurity pyrite is separated. In this process, at least about 25 wt. % of the impurity is separated, more preferably at least about 50 wt. %, and most preferably at least about 75 wt. %.

As noted above, magnetic separation at under about 20,000 Gauss is known. It has been appreciated, however, that there are limits on the effectiveness of such processes. It has previously been thought that at 20,000 Gauss the primary separation is between liberated impurities and trona containing particles. As noted above, it has now been identified that impurities in saline mineral are typically not evenly distributed throughout the saline mineral particles. However, it has been determined that, in performing a magnetic separation on crushed trona ore using a 20,000 Gauss magnetic field, no appreciable separation or difference in magnetic susceptibilities between high and low purity particles occurred. At 23,000 Gauss, an identifiable difference in magnetic susceptibility was noted between the high purity particles and the low purity particles. In a subsequent test, a 28,000 Gauss magnetic field was found to give remarkable separation between the high purity particles and the low purity particles. The high purity particles were subsequently subjected to density separation at a 2.3 specific gravity cut-off. The resulting purity of the product was on the order of about 97%–98%, and the recovery was as high as about 90%–95%. Therefore, in addition to discovering that crushed trona ore actually comprises a large percentage of high purity particles, it has also been discovered that a high purity, high recovery trona product can be obtained by subjecting crushed trona ore to ultra-high intensity magnetic separation. (See, for example, Examples 1, 4 and 8.) Such a process provides significant advantages because acceptable purity levels and recoveries can be achieved without the significantly greater expense associated with recrystallization processes. It should be noted that high intensity magnetic separation processes are more effective at separating pyrite from trona ore having a wide size fraction (e.g., 6×20 mesh or 20×100 mesh) than, for example, density separations such as air tabling. Therefore, a dry separation process using only high intensity separation could be more useful than a dry separation process using density separation when the desired product must be low in pyrite so long as moderate amounts of shortite can be tolerated. For example, it is contemplated by the present inventors that some amount of shortite may be desirable in soda ash in certain applications, such as the production of glass. Alternatively, high intensity magnetic separations can be conducted in combination processes which also include density separations, electrostatic separations or recrystallization processes.

In a further aspect of the present invention it has been surprisingly found that saline mineral particles of −100 mesh can be efficiently separated by high intensity magnetic separation, as described above. It is generally recognized that conventional magnetic separation for such small particles is not effective. It is believed that static charges on the particles prevent effective separation between magnetic and non-magnetic particles. In addition, it is believed that such small particles do not efficiently separate because of a weak magnetic force. However, such small particles can be effectively separated by high intensity magnetic separation. High intensity magnetic separators using a matrix, such as steel wool, are believed to be particularly effective for such small particles. Without intending to be bound by theory, it is believed that the metal matrix functions to physically break up associations between magnetic and non-magnetic particles. In addition, it is believed that the metal matrix is able to dissipate static charges which otherwise hold such particles together. In this aspect of the invention, at least about 25 wt. % of magnetic impurities are separated from the −100 mesh particles, more preferably at least about 50 wt. %, and most preferably at least about 75 wt. %.

Other processes may be utilized to practice the present invention to selectively separate high and low purity portions instead of ultra-high intensity magnetic separation. For example, the process of selectively separating low purity saline mineral from high purity saline mineral comprise performing colorimetric separation. More specifically, for example in the separation of trona, the low purity particles may be separated based upon their darker color than the high purity particles utilizing an automated colorimetric sorting process. Such a process may utilize a video imager in conjunction with appropriately-timed blasts of pressurized gas to deflect the darker colored particles away from the high purity particles.

The impurity stream from the selective separation step, such as ultra-high intensity magnetic separation, can go through one or more scavenger steps to improve the overall recovery. The scavenger step recovers a portion of the impurity stream from the rougher pass through magnetic separation and combines it with the above-described recovered stream or recycles it to the process with or without further size reduction to increase the overall recovery of the magnetic separation step. Furthermore, the recovered stream from magnetic separation can go through one or more magnetic cleaning steps to further remove impurities from the recovered stream and improve the purity of the final product.

The present process may further include removing impurities from the ore containing saline minerals by a density separation method. Density separation methods are based on subjecting an ore to conditions such that materials of different densities physically separate from each other. Thereby, certain impurities having a different density than the desired saline mineral can be separated. The density separation step of the present invention is most preferably a dry process; however, wet density separation processes, such as heavy media separation, can be used as well. In dry density separation processes, the need for processing in a saturated brine solution, solid/brine separation, and drying of the product is eliminated. Consequently, dry processes according to the present invention tend to be cheaper and less complex than wet processes. Any known density separation technique could be used for this step of the present invention, including air tabling or dry jigging.

During such dry separation steps, it is important to maintain a narrow particle size distribution with a particular fraction. That is, the ratio of the largest particle within a fraction of the smallest particle within that fraction should be relatively small. Without such a small ratio of particle size distribution, the differences in particle sizes could tend to dominate the separation process, thereby reducing the density separation effect. For example, it has been found that, in order to get adequate density separation using an air table, the particle size distribution ratio should be about 3.0 or less, preferably about 2.8 or less, and more preferably about 2.2 or less.

As discussed above, density separation is conducted by subjecting the ore to conditions such that materials of different densities separate from each other. The mineral stream having materials of varying densities is separated by a rougher pass into a denser and a lighter stream, or into more than two streams of varying densities. Typically, in the case of beneficiating trona, the separation is made at a specific gravity of about 2.3, and trona is recovered in the lighter stream. The purity of a saline mineral recovered from density separation can be increased by reducing the weight recovery of the recovered stream from the feed stream. At lower weight recoveries, the recovered stream will have a higher purity, but the rougher pass will also have a reduced yield because more of the desired saline mineral will report to the impurity stream. Such a "high purity" process may be beneficial in that it requires less subsequent processing (e.g., separation) of the ore and, in addition, may be of higher value because it can be used in other applications where high purity saline minerals are required.

In an alternative embodiment, the impurity stream from density separation can go through one or more scavenger density separation step(s) to recover additional saline mineral to improve the overall recovery. The scavenger separation is similar to the above-described density separation step. The scavenger step treats the impurity stream from the rougher pass and recovers a portion of the saline mineral therefrom. The recovered scavenger portion is combined with the above-described recovered stream to increase the overall recovery from density separation, or recycles it to other steps in the process, with or without further size reduction.

In a further alternative embodiment, the recovered stream from the rougher pass density separation can go through one or more cleaning density separation steps to further remove impurities from the recovered stream and improve the purity of the final product. The cleaning step is similar to the above-described density separation process in that impurities are removed from the stream by density separation. In both scavenging and cleaning passes, the feed stream into those passes can undergo further size reduction, if desired, for example, to achieve higher liberation.

With regard to the beneficiation of trona, which, prior to calcination, has a density of 2.14 and after calcination has an apparent density of about 1.5, impurities that are removed during the density separation step of the present invention include shortite, having a density of 2.6, dolomite, having a density of 2.8–2.9 and pyrite, having a density of 5.0. Each of these is separable from the trona ore because of differences in density from trona. By practice of the present invention, of the total amount of shortite, dolomite, pyrite and, if present, potentially valuable heavy minerals in the trona ore, the density separation step can remove at least about 10 wt. % and more preferably, about 50 wt. %, and most preferably, about 90 wt. % of the heavy impurity.

In an alternative embodiment, impurities removed during the density separation process can be recovered as a product for commercial use. For example, in the beneficiation of trona, the impurities removed during the air tabling step can comprise as much as 90% shortite. Such shortite may be acceptable, for example, for certain applications where it can be used for neutralization of acids or removal of sulfur from flue gases. In addition, for some trona deposits, potentially valuable heavy minerals may be present. Such minerals can be separated by the method and recovered.

It should be appreciated that the above-identified process steps could be performed along with other process steps. For example, such other process steps can include low or standard intensity magnetic separation, electrostatic separation, or any other suitable separation technique. In addition, the above-identified process steps could be performed in any order. Further, calcination can be conducted at any point in the sequence of process steps and preferably is conducted prior to any magnetic or density separation steps.

In a further embodiment of the present invention, the saline mineral-containing ore can be crushed to achieve liberation of impurities prior to the separation steps. The crushing step of the present invention can be accomplished by any conventional technique, including impact crushing (e.g., cage or hammer mills), jaw crushing, roll crushing, cone crushing, autogenous crushing or semi-autogenous crushing. Autogenous and semi-autogenous crushing are particularly beneficial because the coarse particles of ore partially act as the crushing medium. Moreover, because saline minerals are typically soft, these methods are suitable for use in the present process. In addition, these two crushing methods allow for the continuous removal of crushed material and high grade potentially saleable dust.

In general, crushing to smaller particle size achieves better liberation of impurities and thus improves recovery. However, if the particle size after crushing is too fine, there may be adverse effects upon subsequent separation steps. In addition, over-crushing is not needed for many applications of the present invention and merely increases the costs associated with the crushing step. It has been found that acceptable liberation for the present process can be achieved by crushing the ore to at least about 6 mesh. Preferably, the particle size range after crushing is from about 6 to about 100 mesh and, more preferably, from about 6 to about 65 mesh.

In another embodiment of the present invention, the ore is sized into size fractions prior to the separation steps. Each size fraction is subsequently processed separately. In general, the narrower the range of particle size within a fraction, the higher the efficiency of removal of impurities. This is particularly true if air tabling is used as a density separation step, wherein small particle size distribution ratios are desired. On the other hand, a larger number of fractions will increase the efficiency, but may increase the cost of the overall process. The use of from 1 to 10 fractions has been found to be acceptable. Preferably, the number of fractions is from 4 to 10 and, more preferably, the number of fractions is 8. Any conventional sizing technique can be used for the present process, including screening or air classification. For dividing into 8 fractions, the fractions typically have the following particle size ranges: 6 to 8 mesh; 8 to 10 mesh; 10 to 14 mesh; 14 to 20 mesh; 20 to 28 mesh; 28 to 35 mesh; 35 to 48 mesh; 48 to 65 mesh (Tyler mesh). Utilizing these fractions, the particle size distribution ratio for each fraction is about 1.42. It should be noted that a smaller number of size fractions, including only one size fraction (such as 6 mesh×100 mesh or 6 mesh×0) or two size fractions (such as 6 mesh by 20 mesh and 20 mesh by 0), can be used for high intensity magnetic separations. Without intending to be bound by theory, it is believed that the effects of particle size are reduced under high intensity magnetic separator apparatus designs. Thus, high intensity magnetic separation can be conducted on a size fraction from 6 or 8 mesh by 20, 65 or 100 mesh.

In a further embodiment, the different size fractions can be treated with high intensity magnetic separations using different equipment. For example, in the instance of using three size fractions of 6 mesh by 20 mesh, 20 mesh by 100 mesh, and minus 100 mesh, the two larger size fractions are preferably treated using an apparatus in which particles free fall while subject to a high intensity magnet and are collected on either side of a splitter. Such an apparatus is also known as an open gradient magnetic separator ("OGMS"). The smallest size fraction is preferably treated by a high intensity magnetic separator having a metal matrix.

In yet another embodiment of the present invention, the ore is dried prior to the separation processes set forth above. The drying step removes surface moisture from the ore to better enable the ore to be separated. Drying can be accomplished by any conventional mineral drying technique, including rotary kiln, fluid bed or air drying. The ore can be dried to less than about 2%, and preferably less than about 1% surface moisture content. During the drying process, it is preferred that the saline mineral is not raised to such a temperature for such a period of time that it is calcined. In the case of trona, the drying temperature should remain below about 40 degrees centigrade to avoid calcination.

In still another embodiment of the present invention, a de-dusting step is added to the basic beneficiation process to remove fines before the selective separation step (e.g., magnetic separation). Such a de-dusting step can be conducted before, during or after one or more of the crushing and sizing steps, but preferably before the electrostatic separation, magnetic separation and density separation steps. The fines produced during the processing of trona are relatively high purity trona and are useful in several industrial applications. For example, trona recovered by de-dusting can have a purity of greater than about 94%, preferably greater than about 96% and more preferably greater than about 98%. Fines can be collected in de-dusting steps by use of a baghouse, or other conventional filtering device, and sold as purified trona without further processing.

In a further aspect of the present invention, the magnetic separation achieved by any magnetic separation step of the present invention, including high intensity magnetic separation and conventional intensity magnetic separation, can be improved by subjecting the ore that is being processed to a preliminary magnetic field prior to separation and subsequently separating a portion of impurities from the ore by magnetic separation. Without being bound by theory, it is believed that by subjecting particles being processed to a preliminary magnetic field before physical separation of magnetic from non-magnetic particles, the magnetic tractive force on particles during magnetic separation is greater. In this manner, more efficient separations can be achieved during magnetic separation steps.

The term "preliminary magnetic field" refers to a magnetic field to which a feed stream being processed is subjected prior to physical separation of magnetic from non-magnetic particles. A feed stream being processed can be subjected to a preliminary magnetic field using conventional apparatus known to those in the art. For example, a feed stream can be transported along a conveyor belt and subjected to a magnetic field during linear transport on the conveyor belt. Subsequently, particles will reach the end of the conveyor belt and drop off of the conveyor belt while being subjected to the primary magnetic field for separation.

In this embodiment of the present invention, the preliminary magnetic field typically has a magnetic flux density of greater than about 2000 Gauss, more preferably greater than about 5000 Gauss, and most preferably greater than about 20,000 Gauss. Further, the step of subjecting particles to a preliminary magnetic field is conducted for at least about 1 second, more preferably at least about 30 seconds, and most preferably at least about 60 seconds. The positive effect of a preliminary magnetic field can be further enhanced by increased temperatures. More particularly, the process is conducted at temperatures of at least about 100° C., more preferably 150° C., and most preferably 200° C.

In a further embodiment of the present invention, a saline mineral can be calcined prior to magnetic separation. More particularly, in one aspect of this embodiment, the saline mineral is calcined in an inert atmosphere prior to separating impurities from the ore. In a second aspect of this embodiment, the saline mineral is calcined in an oxidizing atmosphere at a temperature of greater than about 150° C. prior to separating impurities from the ore. In this embodiment of the present invention, it has been surprisingly found that by calcination under the conditions identified above (i.e., an inert atmosphere or an oxidizing atmosphere at high temperature), the subsequent magnetic separation is more efficient than in the absence of such calcining conditions.

As used herein, reference to the term "inert atmosphere" refers to a non-oxidizing atmosphere (i.e., an atmosphere substantially free of oxygen). More particularly, an inert atmosphere is any non-oxygen containing atmosphere and in particular, can comprise carbon dioxide, nitrogen, or water vapor. In a further preferred embodiment, carbon dioxide used for providing an inert atmosphere for calcination purposes can be carbon dioxide which is recycled from an exhaust stream from the calcination process. For example, in the instance of calcination of trona, the byproducts of calcination include carbon dioxide and water. Thus, the water can be condensed from the exhaust stream and the carbon dioxide recycled for use as the calcination gas, for example, in a fluidizing bed.

When using an inert atmosphere in this embodiment, the calcination temperatures typically range between about 43° C. and about 400° C., more preferably between about 100° C. and about 350° C., and most preferably between about 150° C. and about 260° C.

In the aspect of this embodiment of the present invention in which an oxidizing atmosphere is used during calcination, the atmosphere most typically includes air but can include other oxygen containing gases as well. Further, the calcination temperature in this aspect of the invention is at least about 150° C., more preferably at least about 250° C., and most preferably at least about 500° C.

Subsequent to the calcination step as described above, the saline mineral containing ore is then subjected to magnetic separation. Such magnetic separation can include high intensity magnetic separation as generally described herein, or conventional intensity magnetic separation as described herein and otherwise described in the art. In a further preferred embodiment, the process of calcining saline mineral in an inert atmosphere or in an oxidizing atmosphere at a high temperature followed by magnetic separation can also include the step of subjecting the calcined ore to a preliminary magnetic field prior to magnetic separation, as generally described above.

A further embodiment of the present invention includes a process for the purification of saline mineral by magnetic separation in an ore comprising saline mineral and impurities. In this embodiment, the magnetic separation is conducted in a first magnetic field having positions of higher intensity and lower intensity. The process includes pre-aligning the ore on a surface with respect to one or more of the positions of higher intensity of the first magnetic field before separation of impurities and separating a first portion of impurities from the ore by magnetic separation in the first magnetic field. In this manner, higher efficiency of magnetic separation is achieved because the ore is conducted through the first magnetic field at the positions of highest magnetic intensity. Therefore, magnetically susceptible particles are subject to a higher magnetic tractive force and thereby are more readily separated.

The manner in which the step of pre-aligning is conducted will depend, in large part, upon the apparatus used for magnetic separation. For example, in a preferred embodiment, the magnetic separation is conducted by feeding ore onto a conveyor belt which then transports the ore toward one end of the conveyor belt. The magnet creating the first magnetic field is positioned in the rollers at the end of the belt towards which the ore is transported. In this manner, there will be one or more positions along the length of the roller which have higher or maximum intensity of magnetic force compared to other portions of the roller. Thus, in order for the ore to be pre-aligned such that it is primarily contacted with the portion of the roller having a higher intensity magnetic field, it is necessary for the ore to be aligned in the direction of travel of the belt in alignment with the one or more positions of higher intensity. In this embodiment, the step of pre-aligning can be accomplished by a variety of means. For example, in the above example in which an ore feed stream is fed onto a belt which is transported toward a first end of the belt, pre-alignment can be accomplished by subjecting the ore, for alignment purposes only, to a second magnetic field in the vicinity of the portion of the belt at which the ore is fed onto the belt. In this manner, as ore particles are fed onto the belt and are settling to a static position, magnetic particles will tend to migrate and settle in alignment with one or more magnets placed under the belt at the position desired for alignment. Thus, as the ore is subsequently transported toward the end of the belt toward the first magnetic field for purposes of magnetic separation, the magnetic particles will be aligned with the desired position of higher intensity of the first magnetic field. Alternatively, alignment can be accomplished by simple mechanical means of feeding the ore onto the belt at one or more discrete locations across the width of the belt such that as the belt is advanced, a line of ore is laid down on the belt. Thus, alignment is accomplished by aligning the discrete feed discharge point with the one or more positions of higher intensity of the first magnetic field.

The foregoing process including pre-alignment of ore on a surface for magnetic separation can be used alone or in conjunction with other aspects of the present invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

EXAMPLES 1–8

Eight tests were performed on trona-containing ore in accordance with the present invention. The tests were performed on samples generated from ore mined from the Green River Basin in Wyoming. The ore received was crushed to nominal 50 mesh. The ore was screened into size fractions, and the 20×35 fraction was used as the supply for the eight tests. Referring to Table 1, the original 20×35 fraction comprised 94.01% soluble matter (i.e., trona) and 5.99% insoluble matter (i.e., impurities). The 20×35 fraction was subjected to standard magnetic separation utilizing a rare earth separator at its maximum intensity of less than about 20,000 Gauss. The standard magnetic separation step resulted in removal of 3.0% of the weight of the original sample in a magnetic fraction, and the remaining non-magnetic fraction comprised 95.7% trona.

TABLE 1

Analysis of Original 20 × 35 Fraction from Trona Ore

| Product | Weight | | | Water Insol. | | | Water Soluble | | |
|---|---|---|---|---|---|---|---|---|---|
| | % of Feed | % of Prod.* | % of Spl.** | Assay % | Dist. Prod.* | Dist. Spl** | Assay % | Dist. Prod. | Dist. Spl.** |
| NOTE: The feed to the superconductor was processed with the International Process Systems RE Belt Magnet, giving the following results: | | | | | | | | | |
| Magnetic | 3.0 | 3.0 | 60.3 | 30.2 | 30.2 | 39.7 | 1.3 | 1.3 | |
| Non-Mag. | 97.0 | 97.0 | 4.31 | 69.8 | 69.8 | 95.7 | 98.7 | 98.7 | |
| Feed Calc. | 100.0 | 100.0 | 5.99 | 100.0 | 100.0 | 94.01 | 100.0 | 100.0 | |

*Feed to Separation as 100%
**Original Sample as 100%

The non-magnetic fraction from the previous step was then divided into seven (7) samples to be used in eight (8) tests (test 8 was performed on the output from test 7). Each of the eight (8) tests included a two-step separation process: (1) magnetic separation at 28,000 Gauss; and (2) density separation at 2.3 specific gravity on the non-magnetic fraction from the previous step. The density separation was performed with a heavy liquid which simulates density separation with commercial air tables. The heavy liquid used was a mixture of acetylene tetrabromide and kerosene.

Each of the first seven tests had essentially identical feed compositions, and the input to the eighth test was the output from the seventh test. The major difference between the tests was the depth of the impurity cut. In general, the deeper the cut, the higher the purity and the lower the recovery.

The data generated from the foregoing beneficiation processes is shown in Table 2. As can be seen from the Table, the purity of trona in the final product (shown as Water Soluble Assay %—2.3 Float) ranged from 97.20 in Tests 1 and 2 to 98.17 in Test 4. In addition, the recoveries (i.e., the amount of final product divided by the amount of the original sample, shown as Weight % of Spl.—2.3 Float) for the whole process ranged from 67.1 in Test 4 to 95.0 in Test 1.

The effectiveness of the 28,000 Gauss magnetic separation in improving trona purity (i.e., compared to only using 20,000 Gauss magnetic separation) can be seen by comparing the Water Soluble Assay % in the "Non Mag" row (i.e. before density separation) to the Water Soluble Assay % in the "Feed Calc" row.

TABLE 2

Data From Second Series of Super Conducting Magnetic Separations
Feed 20 × 35 Mesh Non-Magnetic Ore

| Test #/ Product | Weight | | | Fe as Fe2O3 | | Water Insol. | | | Water Soluble | | |
|---|---|---|---|---|---|---|---|---|---|---|---|
| | % of Feed | % of Prod. | % of Spl. | Assay % | Dist. % | Assay % | Dist. Prod. | Dist. Spl. | Assay % | Dist. Prod. | Dist. Spl. |
| Test 1 | | | | | | | | | | | |
| Magnetic | | 1.0 | 0.9 | 1.44 | 17.1 | 57.3 | 13.0 | 9.1 | 42.7 | 0.4 | 0.4 |
| Non-Mag. | 100.0 | 99.0 | 96.1 | | 82.9 | 3.74 | 87.0 | 60.7 | 96.26 | 99.6 | 98.3 |
| 2.3 Float | 98.9 | 98.0 | 95.0 | 0.069 | | 2.80 | 64.4 | 44.9 | 97.20 | 99.5 | 98.2 |
| 2.3 Sink | 1.1 | 1.1 | 1.0 | | | 90 | 22.6 | 15.8 | 10 | 0.1 | 0.1 |
| Feed Calc. | | 100.0 | 97.0 | 0.082 | 100.0 | 4.26 | 100.0 | 69.8 | 95.74 | 100.0 | 98.7 |
| Test 2 | | | | | | | | | | | |
| Magnetic | | 1.3 | 1.3 | 1.27 | 19.7 | 50.4 | 15.3 | 10.7 | 49.6 | 0.7 | 0.7 |
| Non-Mag. | 100.0 | 98.7 | 95.7 | | 80.3 | 3.66 | 84.7 | 59.1 | 96.34 | 99.3 | 98.1 |
| 2.3 Float | 99.0 | 97.7 | 94.8 | 0.069 | | 2.80 | 64.1 | 44.7 | 97.20 | 99.2 | 98.0 |
| 2.3 Sink | 1.0 | 1.0 | 0.9 | | | 90 | 20.6 | 14.4 | 10 | 0.1 | 0.1 |
| Feed Calc. | | 100.0 | 97.0 | 0.084 | 100.0 | 4.27 | 100.0 | 69.8 | 95.73 | 100.0 | 98.7 |
| Test 3 | | | | | | | | | | | |
| Magnetic | 7.3 | 7.1 | 0.53 | 42.5 | 19.0 | 32.6 | 22.7 | 81.0 | 6.2 | 6.1 | |
| Non-Mag. | 100.0 | 92.7 | 89.9 | | 57.5 | 3.10 | 67.4 | 47.1 | 96.90 | 93.8 | 92.6 |
| 2.3 Float | 99.0 | 91.8 | 89.1 | 0.057 | | 2.25 | 48.5 | 33.9 | 97.75 | 93.7 | 92.5 |
| 2.3 Sink | 1.0 | 0.9 | 0.9 | | | 90 | 18.9 | 13.2 | 10 | 0.1 | 0.1 |
| Feed Calc. | | 100.0 | 97.0 | 0.091 | 100.0 | 4.50 | 100.0 | 69.8 | 95.74 | 100.0 | 98.7 |
| Test 4 | | | | | | | | | | | |
| Magnetic | | 30.3 | 29.4 | 0.20 | 65.1 | 8.88 | 60.2 | 42.0 | 91.1 | 28.9 | 28.5 |
| Non-Mag. | 100.0 | 69.7 | 67.6 | | 34.9 | 2.56 | 39.8 | 27.8 | 97.44 | 71.1 | 70.2 |
| 2.3 Float | 99.2 | 69.1 | 67.1 | 0.047 | | 1.83 | 28.3 | 19.7 | 98.17 | 71.0 | 70.1 |
| 2.3 Sink | 0.8 | 0.6 | 0.6 | | | 90 | 11.6 | 8.1 | 10 | 0.1 | 0.1 |
| Feed Calc. | | 100.0 | 97.0 | 0.093 | 100.0 | 4.47 | 100.0 | 69.8 | 95.53 | 100.0 | 98.7 |
| Test 5 | | | | | | | | | | | |
| Magnetic | | 12.0 | 11.6 | 0.40 | 49.5 | 14.9 | 41.0 | 28.6 | 85.1 | 10.7 | 10.5 |

TABLE 2-continued

Data From Second Series of Super Conducting Magnetic Separations
Feed 20 × 35 Mesh Non-Magnetic Ore

| Test #/ Product | Weight | | | Fe as Fe2O3 | | Water Insol. | | | Water Soluble | | |
|---|---|---|---|---|---|---|---|---|---|---|---|
| | % of Feed | % of Prod. | % of Spl. | Assay % | Dist. % | Assay % | Dist., Prod. | Dist. Spl. | Assay % | Dist., Prod. | Dist. Spl. |
| Non-Mag. | 100.0 | 88.0 | 85.4 | | 50.5 | 2.93 | 59.0 | 41.2 | 97.07 | 89.3 | 88.2 |
| 2.3 Float | 99.1 | 87.3 | 84.6 | 0.056 | | 2.17 | 43.4 | 30.3 | 97.83 | 89.3 | 88.1 |
| 2.3 Sink | 0.9 | 0.8 | 0.7 | | | 90 | 15.6 | 10.9 | 10 | 0.1 | 0.1 |
| Feed Calc. | | 100.0 | 97.0 | 0.097 | 100.0 | 4.37 | 100.0 | 69.8 | 95.63 | 100.0 | 98.7 |
| Test 6 | | | | | | | | | | | |
| Magnetic | | 3.5 | 3.4 | 0.91 | 35.3 | 32.2 | 50.1 | 18.2 | 67.8 | 2.5 | 2.4 |
| Non-Mag. | 100.0 | 96.5 | 93.6 | | 64.7 | 3.30 | 73.9 | 51.6 | 96.70 | 97.5 | 96.3 |
| 2.3 Float | 99.0 | 95.5 | 92.7 | 0.061 | | 2.43 | 53.8 | 37.6 | 97.57 | 97.4 | 96.2 |
| 2.3 Sink | 1.0 | 1.0 | 0.9 | | | 90 | 20.0 | 14.0 | 10 | 0.1 | 0.1 |
| Feed Calc. | | 100.0 | 97.0 | 0.090 | 100.0 | 4.31 | 100.0 | 69.8 | 95.69 | 100.0 | 98.7 |
| Test 7 | | | | | | | | | | | |
| Magnetic | | 8.0 | 7.8 | 0.54 | 45.5 | 18.9 | 35.0 | 24.4 | 81.1 | 6.8 | 6.7 |
| Non-Mag. | 100.0 | 92.0 | 89.2 | | 54.5 | 3.06 | 65.0 | 45.4 | 96.94 | 93.2 | 92.0 |
| 2.3 Float | 99.0 | 91.1 | 88.3 | 0.057 | | 2.20 | 46.2 | 32.3 | 97.80 | 93.1 | 91.9 |
| 2.3 Sink | 1.0 | 0.9 | 0.9 | | | 90 | 18.7 | 13.1 | 10 | 0.1 | 0.1 |
| Feed Calc. | | 100.0 | 97.0 | 0.095 | 100.0 | 4.33 | 100.0 | 69.8 | 95.67 | 100.0 | 98.7 |
| Test 8 | | | | | | | | | | | |
| Magnetic | | 4.4 | 4.3 | 0.30 | 23.8 | 11.3 | 17.6 | 8.0 | 88.7 | 4.4 | 4.0 |
| Non-Mag. | 100.0 | 87.6 | 84.9 | | 76.2 | 2.67 | 82.4 | 37.4 | 97.33 | 95.6 | 88.0 |
| 2.3 Float | 99.1 | 86.7 | 84.1 | 0.049 | | 1.88 | 56.9 | 25.8 | 98.14 | 95.5 | 87.9 |
| 2.3 Sink | 0.9 | 0.8 | 0.8 | | | 90 | 25.5 | 11.6 | 10 | 0.1 | 0.1 |
| Feed Calc. | | 92.0 | 89.2 | 0.056 | 100.0 | 3.08 | 100.0 | 45.4 | 96.92 | 100.0 | 92.0 |

A summary of the tests results is provided in Table 3. The Table gives the weight recovery of the overall process using the original sample as 100% (Weight, %), the amount of impurities in the final product (% $H_2O$ Insol), the amount of iron as $Fe_2O_3$ in the final product ($Fe_2O_3$, %), and the amount of the original trona remaining in the final product (Trona Dist., %).

TABLE 3

Summary of Non-Magnetic Product
From Superconducting Magnetic Separations
on 20 × 35 Mesh Non-Magnetic Trona Ore

| Non-Magnetic From: | Distributions Based on 20 × 35 Mesh as 100%* | | | |
|---|---|---|---|---|
| | Weight, % | % $H_2O$ Sol*** | $Fe_2O_3$, %*** | Trona Dist., % |
| Feed | 97.0 | 95.69** | 0.09** | 98.7 |
| Test #1 | 95.0 | 97.20 | 0.069 | 98.2 |
| Test #2 | 94.8 | 97.20 | 0.069 | 98.0 |
| Test #3 | 89.1 | 97.75 | 0.057 | 92.5 |
| Test #4 | 67.1 | 98.17 | 0.047 | 70.1 |
| Test #5 | 84.6 | 97.83 | 0.056 | 88.1 |
| Test #6 | 92.7 | 97.57 | 0.061 | 96.2 |
| Test #7 | 88.3 | 97.80 | 0.057 | 91.9 |
| Test #8 | 84.1 | 98.14 | 0.049 | 87.9 |

*Air tabling simulated by heavy liquid separations (SG = 2.3) on Non-Mag.
**Non-Magnetic was not treated with heavy liquid.
***Calculated assay of calcined product based on assay of water insoluble residue.

As can be seen from the values in Table 3, test #4 resulted in excellent purity (98.17%), which is uncharacteristic of most dry separation processes, while achieving moderate recovery (67.1%). Test #1 resulted in outstanding recovery (95.0%) while still achieving a purity (97.2%) in excess of 97%. These two tests illustrate the excellent purities that can be achieved by practicing the present invention.

The process of Test #8 exceeds 98% purity, while still having a recovery greater than 80%. This was accomplished by performing a two-stage ultra-high intensity magnetic separation. More specifically, the non-magnetic fraction from test #7 was run through the ultra-high intensity magnetic separation process a second time. The result is a process which gives a purity almost as good as the best results (test #4), with a satisfactory recovery.

EXAMPLE 9

This example demonstrates that both pyrite and shortite are magnetic.

Six examples of pyrite identified as P-1 through P-6 and two samples of shortite identified as S-1 and S-2 were evaluated for magnetic susceptibility. A description of the samples is provided below in Table 4.

TABLE 4

| | |
|---|---|
| P-1 | Pyrite From trona calcined at 150° C. |
| P-2 | Pyrite from trona calcined at 150° C. and washed with hydrochloric acid |
| P-3 | Pyrite from uncalcined trona |
| P-4 | Pyrite from an ore other than trona from Climax, Colorado |
| P-5 | Trona from ore other than trona from Vulcan, Colorado |
| P-6 | Pyrite from an ore other than trona from Argentina |
| S-1 | Shortite from a non-magnetic fraction of uncalcined trona |
| S-2 | Shortite from a magnetic fraction from a rare earth magnetic separation of uncalcined trona |

The samples were all less than 1 mm in diameter. The testing was done on a vibrating sample magnetometer having a maximum field of 12 tesla. All data were gathered at room temperature, with a time constant of 0.3 seconds and ramping the magnetic field at 20 Oersted/sec. (to 0.4 tesla) or 150 Oersted/sec. (to 2 tesla). Other than for strongly magnetic samples (such as P-5), an appropriate background subtraction was performed. For the measurements on samples P-5 and S-2, the materials were weighed and wrapped with PTFE tape which was then formed into an approximately spherical ball before packing into the sample holder. The resulting ball of material was approximately 5 mm in diameter. The other samples, and also sample P-5, were weighed into gelatin capsules and packed down with cotton wool. The capsule was then locked into a sample holder for measurement. The results of these tests are shown below in Table 5 and in FIGS. 1–8. As can be seen from the results, the magnetic properties of the samples varied from diamagnetic through paramagnetic to weakly ferromagnetic.

TABLE 5

| SAMPLE | MASS (g) | SUSCEPTI-BILITY emu/g. tesla | SATURATION MOMENT emu/G. | PROPERTY |
|---|---|---|---|---|
| P1 | 0.1417 | 0.0128 | | paramagnetic |
| P2 | 0.1480 | 0.0038 | | paramagnetic |
| P3 | 0.1215 | 0.020 | | paramagnetic |
| P4 | 0.1135 | | 0.032 | ferromagnetic |
| P5 (capsule) | 0.1263 | | 0.058 | ferromagnetic |
| P5 (tape) | 0.1777 | | 0.060 | ferromagnetic |
| P6 | 0.1788 | | 0.0056 | paramagnetic |
| S1 | 0.1357 | 0.00031 | | diamagnetic |
| S2 | 0.0784 | | 0.0062 | ferromagnetic with hysteresis |

EXAMPLE 10

This example illustrates the effect of calcination temperature on subsequent magnetic separation of impurities from trona ore.

Trona ore was treated, in both air and in $CO_2$, by calcination at 150° C., 300° C., 450° C., or 600° C. The trona ore was treated by magnetic separation. A control was run on trona with no calcining. Magnetic separation was conducted on a rare earth roll magnet at about 20,000 Gauss. The magnetic and non-magnetic fractions were then assayed for water insoluble content (i.e., impurities) and for water soluble content (i.e., sodium carbonate values). The magnetic and non-magnetic fractions were also assayed for total iron. The results of these experiments are shown below in Table 6 (Calcination in Air) and Table 7 (Calcination in $CO_2$). All separations were done at same RPM and splitter settings.

TABLE 6

| | Not Calcined | Calcined in Air at: | | | |
|---|---|---|---|---|---|
| | | 150° C. | 300° C. | 450° C. | 600° C. |
| Water Insoluble Assays - Non Mag. | 6.25 | 4.93 | 4.67 | 3.43 | 2.34 |
| Water Soluble Assays - Non Mag. | 93.8 | 95.1 | 95.3 | 96.6 | 97.7 |
| Total Iron Assays as Fe - Non Mag. | 0.168 | 0.164 | 0.153 | 0.046 | 0.030 |

TABLE 7

| | Not Calcined | Calcined in CO2 at: | | | |
|---|---|---|---|---|---|
| | | 150° C. | 300° C. | 450° C. | 600° C. |
| Water Insoluble Assays - Non Mag. | 6.25 | 5.95 | 5.84 | 4.42 | 2.34 |
| Water Soluble Assays - Non Mag. | 93.8 | 94.1 | 94.2 | 95.6 | 97.7 |
| Total Iron Assays as Fe - Non Mag. | 0.168 | 0.177 | 0.186 | 0.057 | 0.026 |

The foregoing results illustrate that at higher temperatures of calcination, significantly improved results in magnetic separation is attained.

EXAMPLE 11

This example illustrates magnetic separation with high intensity magnetic separation of impurities from calcined trona which had previously been treated by two passes of over a rare earth magnetic separator.

The initial product was prepared by calcining trona and passing the calcined product over a rare earth magnetic separator to yield magnetic fraction and a non-magnetic fraction. The non-magnetic fraction was again passed over a rare earth magnetic separator to yield a magnetic fraction and a non-magnetic fraction. The non-magnetic fraction from the second pass was used as the initial feed for this experiment. The feed was tested using an OGMS superconducting magnet set at 2 tesla. Four runs were conducted, varying the feed rate, magnet angle and feed gap. The parameters for each run are listed below in Table 8.

TABLE 8

| Run Number | Feed Rate (tph/m) | Magnet Angle (degrees) | Feed Gap (cm) |
|---|---|---|---|
| 1 | 2.5 | 5 | 1 |
| 2 | 10 | 5 | 1 |
| 3 | 10 | 15 | 1 |
| 4 | 10 | 15 | 0.7 |

The magnetic and non-magnetic portions from each of runs 1–4 were then analyzed for water insoluble and water soluble contents, as well as for iron. In addition, each of the non-magnetic and magnetic fractions from runs 1–4 were examined to determine the mineralogy of each of the samples. The results of the analytical testing and mineralogy are shown below in Tables 9 and 10.

TABLE 9

| Desc. | Feed Dist., % | Water Insoluble Assay % | Water Insoluble Dist. % | Water Soluble Assay % | Water Soluble Dist. % | Fe as $Fe_2O_3$ Assay % | Fe as $Fe_2O_3$ Dist. % |
|---|---|---|---|---|---|---|---|
| Feed Sample | | 3.91 | | 96.09 | | 0.114 | |
| Run 1, Non Mags | 97.2 | 3.41 | 82.6 | 96.59 | 97.6 | 0.083 | 86.1 |
| Run 1, Mags | 2.8 | 24.99 | 17.4 | 75.01 | 2.2 | 0.472 | 13.9 |
| Run 2, Non Mags | 91.1 | 3.16 | 75.2 | 96.84 | 91.7 | 0.159 | 87.0 |
| Run 2, Mags | 8.9 | 10.58 | 24.8 | 89.42 | 8.3 | 0.242 | 13.0 |
| Run 3, Non Mags | 97.1 | 3.36 | 86.2 | 96.62 | 97.5 | 0.079 | 87.0 |
| Run 3, Mags | 2.9 | 17.94 | 13.8 | 82.06 | 2.5 | 0.394 | 13.0 |

TABLE 9-continued

| Desc. | Feed Dist., % | Water Insoluble Assay % | Water Insoluble Dist. % | Water Soluble Assay % | Water Soluble Dist. % | Fe as $Fe_2O_3$ Assay % | Fe as $Fe_2O_3$ Dist. % |
|---|---|---|---|---|---|---|---|
| Run 4, Non Mags | 97.0 | 3.29 | 83.7 | 96.71 | 97.5 | 0.104 | 86.1 |
| Run 4, Mags | 3.0 | 20.78 | 16.3 | 79.22 | 2.5 | 0.459 | 11.9 |

TABLE 10

| Description | Mineralogy |
|---|---|
| Feed Sample | Essentially all fine tan shale, minor Shortite (less Shortite than Run 2, non-mags, also some fine), searlesite and dark brown shale. Trace pyrite. |
| Run 1 Non Mags | Essentially all fine tan shale, minor Shortite (less Shortite than Run 2, non-mags, also some fine), Searlesite and dark brown shale. Trace pyrite. |
| Run 1 Mags | Mostly tan shale, subordinate dark brown shale. Minor Shortite frequently inter grown with dark brown shale, but also liberated. Minor to trace northupite, fine grained pyrite frequently inter grown with dark brown shale. Trace Searlesite. |
| Run 2 Non Mags | Essentially all fine tan shale, minor Shortite, Searlesite and dark brown shale. Trace pyrite. |
| Run 2 Mags | Essentially all fine tan shale, minor Shortite (less Shortite than Run 2, non-mags, also some fine), Searlesite an dark brown shale. Trace pyrite. |
| Run 3 Non Mags | Essentially all fine tan shale, minor Shortite (less Shortite than Run 2, non-mags, also some fine), Searlesite and dark brown shale. Trace pyrite. |
| Run 3 Mags | Essentially all fine tan shale, minor Shortite (less Shortite than Run 2, non-mags, also some fine), Searlesite and dark brown shale. Trace pyrite. Increase in dark brown compact shale (15 to 10%) |
| Run 4 Non Mags | Essentially all fine tan shale, minor Shortite, Searlesite and dark brown shale. Trace pyrite. |
| Run 4 Mags | Essentially all fine tan shale, minor Shortite (less Shortite than Run 2, non-mags, also some fine), Searlesite and dark brown shale. Trace pyrite. Increase in dark brown compact shale (15 to 10%) |

The foregoing results demonstrate that at a magnetic strength of 2 tesla, an OGMS superconducting magnetic separator improved the purification of a non-magnetic fraction from a rare earth magnetic separator with a high recovery. Moreover, the mineralogical evaluation of the sample showed that even at 2 tesla, some pyrite and shortite showed up in the magnetic fraction. The use of high intensity magnetic separation provided improved separation of impurities compared to the use of rare earth magnetic separation with the same size fraction and magnetic strength. The use of an OGMS superconducting magnetic separator has the advantage of eliminating centrifugal forces found with conventional roll type magnetic separators. Centrifugal forces can cause particles to report to the far side of the splitter due to mass considerations rather than magnetic susceptibility.

EXAMPLE 12

This example illustrates the magnetic separation of impurities from either trona or calcined trona using an OGMS.

Seventeen runs were conducted using a feedstream of either trona or calcined trona calcined at 150° C. The feedstreams were either a size fraction of 6 mesh by 20 mesh or 20 mesh by 100 mesh. The experimental setup varied the gap width and the splitter gap width. The gap width is the horizontal distance between the drop-off point of the feed and the magnet. The splitter gap width is the horizontal distance between the splitter and a point on the magnet face which is closest to the arc of the feedstream. The separations were conducted at a magnetic field strength of 4 tesla, with a magnet angle of 11°.

The percentage of pyrite in the feed was calculated and, for some runs, determined by analysis. In addition, the percent pyrite in the non-magnetic fraction was analyzed. In addition, the weight-percent recovery in the non-magnetic fraction was calculated, as was the weight-percent recovery of soluble material in the non-magnetic fraction.

The various gap and splitter gap widths as well as the experimental results are shown below in Table 11.

TABLE 11

| Material | Size Mesh | Test # | % $Fe_2O_3$ in feed as anal. | % $Fe_2O_3$ in feed as calc. | % $Fe_2O_3$ in NM | NM % wt Rec. | NM % Soluble $H_2O$ Rec. | GAP MM* | SPLITTER GAP MM |
|---|---|---|---|---|---|---|---|---|---|
| Trona | 6 × 20 | 1 | N/A | 0.39 | 0.15 | 89.7 | 96 | 15 | 16 |
| Trona | 6 × 20 | 2 | N/A | 0.31 | 0.19 | 93.5 | 99.4 | 20 | 18 |
| Trona | 6 × 20 | 3 | N/A | 0.34 | 0.11 | 80.6 | 89.8 | 15 | 32 |
| Trona | 6 × 20 | 4 | 0.31 | 0.32 | 0.1 | 89.7 | 97.4 | 15 | 16 |
| Trona | 6 × 20 | 5 | 0.31 | 0.37 | 0.12 | 44.9 | 49.5 | 15 | 25 |
| Trona | 6 × 20 | 6 | 0.31 | 0.38 | 0.13 | 85.1 | 93.5 | 15 | 22 |
| Trona | 20 × 100 | 7 | 0.82 | 0.97 | 0.2 | 50.6 | 56.9 | 15 | 24 |
| Trona | 20 × 100 | 8 | 0.82 | 0.47 | 0.23 | 92.3 | 95.4 | 15 | 21 |
| Trona | 20 × 100 | 9 | 0.82 | 0.94 | 0.35 | 96.7 | 96.5 | 25 | 18 |
| Cal. Trona | 6 × 20 | 10 | N/A | 0.41 | 0.09 | 67.1 | 73.8 | 15 | 30 |
| Cal. Trona | 6 × 20 | 11 | N/A | 0.41 | 0.11 | 81.6 | 87.9 | 15 | 25 |
| Cal. Trona | 6 × 20 | 12 | 0.31 | 0.39 | 0.12 | 74.5 | 81.6 | 15 | 21 |

TABLE 11-continued

| Material | Size Mesh | Test # | % $Fe_2O_3$ in feed as anal. | % $Fe_2O_3$ in feed as calc. | % $Fe_2O_3$ in NM | NM % wt Rec. | NM % Soluble $H_2O$ Rec. | GAP MM* | SPLITTER GAP MM |
|---|---|---|---|---|---|---|---|---|---|
| Cal. Trona | 6 × 20 | 13 | 0.31 | 0.29 | 0.14 | 88.6 | 95.6 | 15 | 25 |
| Cal. Trona | 20 × 100 | 14 | N/A | 0.15 | 0.13 | 98.7 | 99.7 | 15 | |
| Cal. Trona | 20 × 100 | 15 | N/A | 0.15 | 0.1 | 95.7 | 97.9 | 15 | 30 |
| Cal. Trona | 20 × 100 | 16 | 0.82 | 0.91 | 0.22 | 79.7 | 88.3 | 15 | 16 |
| Cal. Trona | 20 × 100 | 17 | 0.82 | 1.1 | 0.24 | 86.6 | 94.2 | 15 | 15 |

These results show a separation using high intensity magnetic separation, such as OGMS, can, with a wide size fraction (e.g., 6×20 mesh or 20×100 mesh), produce equal or better purification when compared to conventional magnetic separation using multiple narrow size factions (e.g., 1×8 mesh, 8×10 mesh, 10×20 mesh, etc.).

EXAMPLE 13

This example illustrates the use of magnetic separation of impurities from soda ash or trona using a superconducting magnet with a metal matrix to remove impurities from a dry feedstream.

Nine test runs were conducted in this experiment. The feed material for each test run is described below in Table 12.

TABLE 12

| Run Number | Type | Material | Size Range (Tyler Mesh) |
|---|---|---|---|
| 1 | T-50 | Calcined Trona | 100 × 150 |
| 2 & 3 | T-50 | Trona | 20 × 150 |
| | T-50 | Calcined Trona | 20 × 150 |
| 6, 7 & 8 | Air Table Heavies | Calcined Trona | 28 × 35 |
| 9 | T-50 | Calcined Trona | 100 × 0 |

The feedstream was introduced at a feed rate of 25 cm³/s. The magnetic field was set at 5 tesla. The matrix material in this test was an expanded metal matrix having a matrix size of ¼ inch. Non-magnetic material exited the bottom of the unit while the magnetic fraction was held in the matrix.

Run 1 was conducted to determine the effect of vibration on the flow of material through the magnetic separator. The frequency of a vibrator of the matrix was varied from 40 HZ to 25 HZ, and then 10 HZ. Approximately 100 g of feed was fed through at each frequency setting. The non-magnetic fraction from each run was collected and the final magnetic fraction from the total of the three settings was also collected.

Run 2 was conducted to evaluate the capacity of the matrix and how the purity of the non-magnetic fraction was affected as the matrix was loaded up with a magnetic fraction. The magnetic separator was fed 100 g of feedstream at a time until 1000 g had been run through the matrix without removing any magnetic fraction from the matrix. After the last 100 g had been run through the matrix, the magnetic fraction was removed from the matrix by ramping down the magnetic coil in tesla increments. The first sample was produced by reducing the field from 5 tesla to 3 tesla. The next three samples were recovered by reducing the magnetic field from 3 to 2 tesla, from 2 to 1 tesla, and from 1 to 0 tesla. A final magnetic sample was recovered by shaking the unit at 0 tesla.

Run 3 was conducted to determine whether a second pass through the magnetic separator would improve the purity of the non-magnetic fraction. A feedstream of about 150 g was used.

Run 4 was similar to Run 2, except that calcined trona was used instead of trona. In addition, instead of ten portions of 100 g, Run 4 included five samples of 160 g. Further, the magnetic samples included a division of the 5-3 tesla sample into a 5-4 tesla and a 4-3 tesla sample.

Run 5 was conducted to confirm the results obtained from Run 4 and determine repeatability of the test method.

Run 6 used the heavy portion of a density separation of calcined trona. The heavy portion of such a density separation included a large percentage of shortite, shale and pyrite. Thus, the feed material is enriched in these impurities. A feedstream of 200 g of this material was used. However, the matrix became blocked as a result of the coarse nature of the feed material.

Run 7 repeated Run 6 except that a higher frequency on the vibrator was used to allow all of the feed material to pass through the matrix.

Run 8 repeated Run 7 but less feed material (i.e., 100 g of feed material) was used. After the first pass, the magnetic fraction was removed from the matrix before running the non-magnetic fraction through for a second pass.

Run 9 was conducted to evaluate the effect of magnetic separation on very fine material. Due to the poor flow characteristics of this feed material, the matrix became blocked.

The samples from each of the runs were weighed and analyzed for insoluble material. The insoluble material was analyzed by microscopic examination and by chemical analysis. The analytical results for this example are shown in Tables 13 and 14. These test results show that using high intensity magnetic separation with a metal matrix makes separations of finer size fractions possible. Conventional technology only permits narrow size ranges to be separated to a level of purity that was achieved with use of high intensity magnetic separation in a matrix material using a large size range (20×100 mesh). Also, the separation of material of less than 150 mesh is now possible when conventional rare earth and induced roll magnetic separation cannot process those size fractions.

TABLE 13

| Sample # | Description | Feed Dist. % | Water Insoluble, (%) Assay | Water Insoluble, (%) Dist. | Water Soluble, (%) Assay | Water Soluble, (%) Dist. | Fe as Fe$_2$O$_3$ (%) Assay | Fe as Fe$_2$O$_3$ (%) Dist. | Ca as CaO (%) Assay | Ca as CaO (%) Dist. | Mg as MgO (%) Assay | Mg as MgO (%) Dist. | K as K$_2$O (%) Assay | K as K$_2$O (%) Dist. | Al as Al$_2$O$_3$ (%) Assay | Al as Al$_2$O$_3$ (%) Dist. | Si as SiO$_2$ (%) Assay | Si as SiO$_2$ (%) Dist. | Total S as S, (%) Assay | Total S as S, (%) Dist. |
|---|---|---|---|---|---|---|---|---|---|---|---|---|---|---|---|---|---|---|---|---|
| Calcined Trona | | | | | | | | | | | | | | | | | | | | |
| 1a | Run 1, Feed Sample | | 3.06 | | 96.94 | | 0.115 | | | | | | | | | | | | | |
| 1b | Run 1, 40 HZ Non Mags | 25.6 | 1.67 | 14.1 | 98.33 | 25.9 | 0.024 | 5.4 | | | | | | | | | | | | |
| 1c | Run 1, 25 HZ Non Mags | 30.1 | 1.74 | 17.3 | 98.26 | 30.5 | 0.026 | 6.9 | | | | | | | | | | | | |
| 1d | Run 1, 10 HZ Non Mags | 40.3 | 1.82 | 24.3 | 98.18 | 40.8 | 0.029 | 10.1 | | | | | | | | | | | | |
| 1e | Run 1, Mags | 2.8 | 46.40 | 43.4 | 53.60 | 1.6 | 2.960 | 72.4 | | | | | | | | | | | | |
| 1f | Run 1, Mags Cleanout | 1.2 | 2.02 | 0.8 | 97.98 | 1.2 | 0.115 | 5.3 | | | | | | | | | | | 0.022 | |
| 4a, 5a | Runs 4 and 5 Feed Sample | | 6.22 | | 93.78 | | 0.153 | | 1.06 | | 0.61 | | 0.21 | | | | | | 0.081 | |
| 4b | Run 4, 1st Non Mag | 17.8 | 2.82 | 7.4 | 97.18 | 18.6 | 0.080 | 8.4 | 0.59 | | 0.17 | | 0.04 | | | | | | | |
| 4c | Run 4, 2nd Non Mag | 18.4 | 2.99 | 8.1 | 97.01 | 19.2 | 0.059 | 6.4 | | | | | | | | | | | | |
| 4d | Run 4, 3rd Non Mag | 18.3 | 3.11 | 8.4 | 96.89 | 19.0 | 0.059 | 6.4 | | | | | | | | | | | | |
| 4e | Run 4, 4th Non Mag | 18.3 | 3.20 | 8.7 | 96.80 | 19.0 | 0.068 | 7.3 | | | | | | | | | | | | |
| 4f | Run 4, 5th Non Mag | 18.2 | 3.48 | 9.4 | 96.52 | 18.8 | 0.077 | 8.2 | | | | | | | | | | | | |
| 4g | Run 4, Mag 0 Tesla Shake | 1.1 | 35.26 | 5.7 | 64.74 | 0.8 | 1.128 | 7.2 | 4.23 | | 3.67 | | 1.39 | | 2.10 | | 10.51 | | 0.681 | |
| 4h | Run 4, Mag 1-0 Tesla | 3.7 | 58.86 | 31.8 | 41.14 | 1.6 | 1.672 | 36.1 | 6.89 | | 6.59 | | 2.58 | | | | | | 0.854 | |
| 4i | Run 4, Mag 2-1 Tesla | 2.0 | 42.26 | 12.3 | 57.74 | 1.2 | 1.069 | 12.4 | 5.03 | | 4.48 | | 1.80 | | | | | | 0.562 | |
| 4j | Run 4, Mag 3-2 Tesla | 0.9 | 54.96 | 7.1 | 45.04 | 0.4 | 1.292 | 6.6 | 6.87 | | 5.25 | | 2.02 | | | | | | 0.747 | |
| 4k | Run 4, Mag 4-3 Tesla | 1.1 | 5.74 | 0.9 | 94.26 | 1.1 | 0.148 | 0.9 | 0.90 | | 0.44 | | 0.15 | | | | | | 0.093 | |
| 4l | Run 4, Mag 5-4 Tesla | 0.3 | 4.25 | 0.2 | 95.75 | 0.3 | | | | | | | | | | | | | | |
| 5b | Run 5, Non Mag | 88.8 | 2.94 | 41.1 | 97.06 | 92.0 | 0.056 | 31.4 | 8.34 | | 3.04 | | | | | | | | 0.060 | |
| 5c | Run 5, Mag | 11.2 | 33.33 | 58.9 | 66.67 | 8.0 | 0.977 | 68.6 | | | | | | | | | | | | |
| 6a, 7a, 8a | Runs 6, 7, 8 Feed Sample | | 40.48 | | 59.52 | | 0.963 | | | | | | | | | | | | | |
| 6b | Run 6, Non Mag | 28.2 | 23.01 | 16.2 | 76.99 | 36.2 | 0.235 | 7.3 | 7.64 | 27.2 | 0.34 | 3.2 | | | | | | | | |
| 6c | Run 6, Mag | 71.8 | 46.67 | 83.8 | 53.33 | 63.8 | 1.176 | 92.7 | 8.03 | 72.8 | 4.01 | 96.8 | | | | | | | | |
| 7b | Run 7, Non Mag | 66.9 | 24.39 | 40.1 | 75.61 | 85.2 | 0.249 | 17.8 | 8.20 | 66.6 | 0.33 | 7.5 | | | | | | | | |

TABLE 13-continued

Analytical Test Results on a Soda Ash Basis

| Sample # | Description | Feed Dist. % | Water Insoluble Assay | Water Insoluble Dist. | Water Soluble Assay | Water Soluble Dist. | Fe as $Fe_2O_3$ (%) Assay | Fe as $Fe_2O_3$ (%) Dist. | Ca as CaO (%) Assay | Ca as CaO (%) Dist. | Mg as MgO (%) Assay | Mg as MgO (%) Dist. | K as $K_2O$ (%) Assay | K as $K_2O$ (%) Dist. | Al as $Al_2O_3$ (%) Assay | Al as $Al_2O_3$ (%) Dist. | Si as $SiO_2$ (%) Assay | Si as $SiO_2$ (%) Dist. | Total S as S (%) Assay | Total S as S (%) Dist. |
|---|---|---|---|---|---|---|---|---|---|---|---|---|---|---|---|---|---|---|---|---|
| 7c | Run 1, Mag | 33.1 | 73.43 | 59.9 | 26.57 | 14.8 | 2.313 | 82.2 | 8.30 | 33.4 | 8.30 | | | | | | | | | |
| 8b | Run 8, Non Mag after 2nd Pass | 59.2 | 22.43 | 33.7 | 77.57 | 75.7 | 0.185 | 11.3 | 7.49 | | 0.29 | 92.5 | | | | | | | | |
| 8c | Run 8, Mag after 1 Pass | 34.4 | 70.99 | 62.1 | 29.01 | 16.5 | 2.194 | 78.4 | 7.95 | | 7.88 | | | | | | | | | |
| 8d | Run 8, Mag after 2nd Pass | 6.4 | 25.41 | 4.1 | 14.59 | 7.9 | 1.540 | 10.2 | | | | | | | | | | | | |
| 9a | Run 9, Feed Sample | 93.4 | 8.37 | 95.9 | 91.63 | 93.2 | 0.187 | 96.8 | | | | | | | | | | | | |
| 9b | Run 9, Non Mag | 6.6 | 5.08 | 4.1 | 94.92 | 6.8 | 0.087 | 3.2 | | | | | | | | | | | | |
| Trona | | | | | | | | | | | | | | | | | | | | |
| 2a, 3a | Runs 2, 3 Feed Sample | | 8.34 | | 91.66 | | 0.221 | | 1.47 | | 0.66 | | 0.23 | | 0.35 | | 1.89 | | 0.147 | |
| 2b | Run 2, 1st Non Mag | 8.3 | 4.17 | 4.2 | 95.83 | 8.6 | 0.085 | 3.1 | 1.07 | | 0.20 | | 0.05 | | 0.08 | | 0.61 | | 0.059 | |
| 2c | Run 2, 2nd Non Mag | 8.9 | 4.06 | 4.5 | 95.94 | 9.3 | 0.094 | 3.7 | | | | | | | | | | | | |
| 2d | Run 2, 3rd Non Mag | 9.1 | 4.19 | 4.7 | 95.81 | 9.5 | 0.097 | 3.9 | | | | | | | | | | | | |
| 2e | Run 2, 4th Non Mag | 9.1 | 4.08 | 4.5 | 95.92 | 9.5 | 0.100 | 4.0 | | | | | | | | | | | | |
| 2f | Run 2, 5th Non Mag | 9.0 | 4.29 | 4.8 | 95.71 | 9.4 | 0.108 | 4.3 | | | | | | | | | | | | |
| 2g | Run 2, 6th Non Mag | 9.2 | 4.33 | 4.9 | 95.67 | 9.6 | 0.113 | 4.6 | | | | | | | | | | | | |
| 2h | Run 2, 7th Non Mag | 9.2 | 4.36 | 4.9 | 95.64 | 9.5 | 0.116 | 4.7 | | | | | | | | | | | | |
| 2i | Run 2, 8th Non Mag | 9.0 | 4.43 | 4.9 | 95.57 | 9.4 | 0.117 | 4.7 | | | | | | | | | | | | |
| 2j | Run 9th Non Mag | 8.9 | 4.82 | 5.3 | 95.18 | 9.3 | 0.142 | 5.6 | | | | | | | | | | | | |
| 2k | Run 2, 10th Non Mag | 8.9 | 5.26 | 5.7 | 94.74 | 9.2 | 0.146 | 5.7 | | | | | | | | | | | | |
| 2l | Run 2, Mag 0 Tesla Shake | 2.6 | 40.63 | 12.7 | 59.37 | 1.6 | 1.329 | 15.0 | 4.83 | | 3.92 | | 1.54 | | 2.41 | | 12.39 | | 0.825 | |
| 2m | Run 2, Mag 0 Tesla | 3.8 | 57.44 | 26.9 | 42.56 | 1.8 | 1.660 | 27.9 | 6.72 | | 5.80 | | 2.31 | | 3.56 | | 17.52 | | 0.988 | |
| 2n | Run 2, Mag 2-1 Tesla | 2.3 | 33.45 | 9.4 | 66.55 | 1.7 | 0.937 | 9.5 | 3.95 | | 3.17 | | 1.27 | | 1.92 | | 9.93 | | 0.559 | |
| 2o | Run 2, Mag 3-2 Tesla | 0.8 | 15.59 | 1.5 | 84.41 | 0.7 | 0.536 | 1.8 | | | | | | | | | | | 0.329 | |
| 2p | Run 2, Mag 5-3 Tesla | 0.9 | 8.85 | 1.0 | 91.14 | 0.9 | 0.377 | 1.5 | | | | | | | | | | | 0.199 | |

TABLE 13-continued

Analytical Test Results on a Soda Ash Basis

| Sample # | Description | Feed Dist. % | Water Insoluble, (%) Assay | Dist. | Water Soluble, (%) Assay | Dist. | Fe as Fe₂O₃ (%) Assay | Dist. | Ca as CaO, (%) Assay | Dist. | Mg as MgO, (%) Assay | Dist. | K as K₂O, (%) Assay | Dist. | Al as Al₂O₃, (%) Assay | Dist. | Si as SiO₂, (%) Assay | Dist. | Total S as S, (%) Assay | Dist. |
|---|---|---|---|---|---|---|---|---|---|---|---|---|---|---|---|---|---|---|---|---|
| 3b | Run 3, Non Mag after 1 Pass | 15.9 | 4.22 | 8.5 | 95.78 | 16.5 | 0.084 | 5.5 | | | | | | | | | | | 0.054 | |
| 3c | Run 3, Non Mag after 2nd Pass | 67.9 | 3.83 | 32.8 | 96.17 | 71.0 | 0.077 | 21.7 | 0.98 | | 0.17 | | 0.05 | | 0.07 | | 0.51 | | 0.052 | |
| 3c | Run 3, Mag after 2nd Pass | 16.2 | 28.90 | 58.8 | 71.10 | 12.5 | 1.087 | 72.8 | 3.53 | | 2.95 | | 1.16 | | | | | | | |

TABLE 14

Mineralogy of Test Samples

| Sample # | Description | Mineralogy |
|---|---|---|
| Calcined Trona | | |
| 1a | Run 1, Feed Sample | Mostly fine shale and shortite, minor to trace sepiolite, northupite, searlesite, fairly abundant tarnished pyrite. |
| 1b | Run 1, 40 HZ Non Mags | Mostly fine shale and shortite, minor to trace sepiolite, northupite, searlesite. No obvious pyrite |
| 1c | Run 1, 25 HZ Non Mags | Mostly fine shale and shortite, minor to trace sepiolite, northupite, searlesite. Trace pyrite. |
| 1d | Run 1, 10 HZ Non Mags | Mostly fine shale and shortite, minor to trace sepiolite, northupite, searlesite. Trace very fine pyrite. |
| 1e | Run 1, Mags | Quite different. Mostly compact but fine tan-greenish shale not powdery like fine shale in other samples. Also, abundant fine compact dark brown shale. Abundant northupite, minor shortite, trace pyrite and searlesite. |
| 1f | Run 1, Mags Cleanout | Mostly shortite (60 to 70%) and fine tan shale with subordinate strongly magnetic "rust" particles with fused appearing surfaces. Minor (1 to 3%) pyrite with highly tarnished surfaces, northupite, both discrete and admixed with shale (dolomite) and sepiolite. |
| 4a, 5a | Runs 4 and 5 | Mostly fine tan shale and subordinate shortite and dark brown compact shale (appreciably more than in Sample #4b). Minor to trace pyrite (more than Sample #4b) and searlesite. |
| 4b | Run 4, 1st Non Mag | Mostly fine shale and much coarse shortite. Subordinate to minor dark brown particulate shale. Trace searlesite and pyrite. |
| 4c | Run 4, 2nd Non Mag | Mostly fine shale and much coarse shortite. Subordinate to minor dark brown particulate shale. Trace searlesite and pyrite. |
| 4d | Run 4, 3rd Non Mag | Mostly fine shale and much coarse shortite, but less than previous sample. Subordinate to minor dark brown particulate shale. Trace searlesite and pyrite. |
| 4e | Run 4, 4th Non Mag | Mostly fine shale and much coarse shortite. Subordinate to minor dark brown particulate shale. Trace searlesite and pyrite. |
| 4f | Run 4, 5th Non Mag | Mostly fine shale and much coarse shortite. Subordinate to minor dark brown particulate shale. Trace searlesite and pyrite. |
| 4g | Run 4, Mag 0 Tesla Shake | Virtually all shale, tan more abundant than dark brown. Both contain admixed northupite. Minor sepiotite and shortite and traces of searlesite, sugary northupite and pyrite both liberated and locked with shale. Pyrite appears fresh. Possibly more shortite than Sample #4i. |
| 4h | Run 4, Mag 1-0 Tesla | Virtually all shale, tan more abundant than dark brown. Both contain admixed northupite. Minor sepiolite and shortite and traces of searlesite, sugary northupite and pyrite both liberated and locked with shale. Pyrite appears fresh with slightly more tarnished pyrite. Possibly less shortite than Sample #4i. |
| 4i | Run 4, Mag 2-1 Tesla | Virtually all shale, tan more abundant than dark brown. Both contain admixed northupite. Minor sepiolite and shortite and traces of searlesite, sugary northupite and pyrite both liberated and locked with shale. Pyrite appears fresh. |
| 4j | Run 4, Mag 3-2 Tesla | Virtually all shale, tan more abundant than dark brown. Both contain admixed northupite. Minor sepiolite and shortlife and traces of searlesite, sugary northupite and pyrite both liberated and locked with shale. Pyrite appears fresh. |
| 4k | Run 4, Mag 4-3 Tesla | Majority is shale (both types) and ± 30% shortite and minor searlesite (more than Sample #4i). Both shales contain admixed northupite. Also more sepiolite than Sample #4i. Traces of searlesite, sugary northupite and pyrite both liberated and locked with shale. Pyrite appears fresh. |
| 4l | Run 4, Mag 5-4 Tesla | Majority is shale (both types) and 40 to 50% shortite and minor searlesite (more than Sample #4i). Both shales contain admixed northupite. Also more sepiolite than Sample #4i. Sepiolite conspicuous causing more tangled up lumps. Traces of searlesite, sugary northupite and pyrite both liberated and locked with shale. Pyrite appears fresh. |
| 5b | Run 5, Non Mag | Mostly fine shale and much coarse shortite. Subordinate to minor dark brown particulate shale. Trace searlesite and pyrite. |
| 5c | Run 5, Mag | Distinctly different from Sample #5b. Predominantly (60 to 70%) tan-greenish compact relatively coarse shale and and 30 to 40% dark brown compact shale. Minor (2–3%) shortite and trace pyrite, fairly frequently locked with dark brown compact shale, searlesite and sepiolite. |
| 6a, 7a, 8a | Runs 6, 7, 8 Feed Sample | About 60 to 70% shortite, balance tan-greenish shale (both compact cellular and fine) and dark brown compact shale and 1% pyrite mostly as liberated cubes, less frequently lock with dark brown shale. |
| 6b | Run 6, Non Mag | About 90 to 95% shortite, balance mostly fine tan shale, 1% liberated and locked (with shortite) pyrite. Some pyrite is tarnished. Trace searlesite. |
| 6c | Run 6, Mag | About 60% shale, mostly tan-greenish compact, less dark brown compact, 40% shortite, 1% pyrite. |
| 7b | Run 7, Non Mag | About 90 to 95% shortite, balance mostly fine tan shale. About 0.5 to 1% pyrite mostly as liberated cubes, less commonly locked with shortite. |
| 8b 2nd Pass | Run 6, Non Mag after | Mostly shortite (90 to 95%), balance mostly fine tan shale. Trace (5 to 1%) pyrite and searlesite. |
| 8c | Run 8, Mag after 1 Pass | Mostly compact fairly coarse tan-greenish shale (80%), 10% dark brown compact shale, 10% shortite. 1% pyrite both relatively coarse liberated cubes, also tarnished fragments and frequently locked with dark brown compact shale. |
| 8d | Run 8, Mag after | Predominantly shortite (80%), subordinate fine shale and northupite and minor pyrite (3 to 5%). The pyrite is slightly tarnished and is mostly liberated but also frequently locked with shale and shortite. |
| 9a | Run 9. Feed Sample | Mostly fine tan shale and rather fine shortite, subordinate dark brown compact shale. Trace pyrite and searlesite. |
| 9b | Run 9, Non Mag | Predominantly shortite (60 to 70%), subordinate fine shale and about 10% strongly magnetic fused appearing "rust". Minor searlesite, northupite and pyrite (1% or less). Similar to Sample #1f. |
| Trona | | |
| 2a, 3a | Runs 2, 3 Feed Sample | Mostly shortite and shale (both fine tan an particulate dark brown), minor searlesite, northupite, sepiolite and pyrite. |
| 2b | Run 2, 1st Non Mag | Mostly shortite and tan fine shale. Dark brown particulate almost absent. Minor searlesite, northupite, sepiolite and pyrite. Pyrite reduced compared to Sample #2a, 3a. |
| 2c | Run 2, 2nd Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a. |
| 2d | Run 2, 3rd Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a. |

TABLE 14-continued

Mineralogy of Test Samples

| Sample # | Description | Mineralogy |
|---|---|---|
| 2e | Run 2, 4th Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a. |
| 2f | Run 2, 5th Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a, but possibly slight increase in pyrite over Sample #2c. |
| 2g | Run 2, 6th Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a. |
| 2h | Run 2, 7th Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a. |
| 2i | Run 2, 8th Non Mag | Mostly shortite and tan fine shale. Dark brown particulate almost absent, but slight increase over Sample #2b. Minor searlesite, northupite, sepiolite and pyrite. Pyrite reduced compared to Sample #2a, 3a. |
| 2j | Run 2, 9th Non Mag | Significant increase in shortite (60 to 70%) and some increase in dark brown particulate shale compared to Sample #2i. Minor searlestite, northupite, sepiolite and pyrite. Pyrite reduced compared to Sample #2a, 3a, but slight increase over Sample #2c. |
| 2k | Run 2, 10th Non Mag | Significant increase in shortite (60 to 70%) and some increase in dark brown particulate shale compared to Sample #2i. Minor searlesite, northupite, sepiolite and pyrite. Pyrite decreased to trace. |
| 2l | Run 2, Mag 0 Tesla Shake | Mostly shale (60% tan greenish, now particulate and mostly finer and 40% dark brown particulate), trace shortite, searlesite, sepiolit3 and pyrite. The majority of the pyrite occurs locked in dark brown particulate shale with a litle more liberated pyrite. |
| 2m | Run 2, Mag 0 Tesla | Mostly shale (60% tan greenish, now particulate and 40% dark brown particulate), trace shortite, searlesite, sepiolite and pyrite. The majority of the pyrite occurs locked in dark brown particulate shale. |
| 2n | Run 2, Mag 2-1 Tesla | Roughly 1:1 mixture of tan-greenish particulate and dark brown particulate shale. Quite coarse grained. Trace shortite (liberated), searlesite4 and pyrite mostly locked with dark brown shale and rarely liberated. |
| 2o | Run 2, Mag 3-2 Tesla | Roughly 1:1 mixture of tan-greenish particulate and dark brown particulate shale. Tan-greenish shale more cellular as though derived from trona interslices. Quite coarse grained. Slightly more shortite (liberated), searlesite and slightly more pyrite and sepiolite. |
| 2p | Run 2, Mag 5-3 Tesla | Shortite 40%, balance tan-greenish cellular and dark brown particulate shale. Minor pyrite (1%) and minor to trace searlesite and sepiolite. |
| 3b | Run 3, Non Mag after 1 Pass | Shortite 70%, balance mostly fine tan-greenish shale. Minor searlesite, northupite, sepiolite and mostly liberated pyrite (2 to 3%). |
| 3c | Run 3, Non Mag after 2nd Pass | Mostly shortite and fine dispersed tan-greenish shale. Dark brown particulate almost absent. Minor searlesite, northupite, and sepiolite. Trace liberated pyrite. |
| 3d | Run 3, Mag after 2nd Pass | About 70% compact tan-greenish shale, 25% dark brown compact shale, 3 to 5% shortite, 2 to 3% pyrite, some as coarse liberated cubes and fragments and frequently finely locked with dark brown compact shale. Trace searlestite and sepiolite. |

EXAMPLE 14

This example illustrates the use of magnetic separation using a superconducting magnetic separator process having a metal matrix for capture of particles wherein the feedstream is a wet slurry.

The feed material for four test runs of this example was produced by dissolving about 6,000 g of soda ash prepared by calcining trona in 4 gallons of warm water. This slurry was screened at 100 mesh to remove the +100 mesh insolubles. A fifth test run slurry was made by dissolving filter cake from a sodium carbonate recrystallization process to make a saturated −100 mesh insolubles slurry. The feed materials for this example are shown in Table 15.

TABLE 15

Feed Material

| Run Number | Slurry Type | Prescreened | Size Range (Tyler Mesh |
|---|---|---|---|
| 1, 2 & 3 | calcined trona | Yes | 100 × 150 |
| 4 | calcined trona | No | 20 × 100 |
| 5 | filter cake | No | 100 × 0 |

The test parameters in terms of feed rate, magnetic field and matrix material are shown in Table 16.

TABLE 16

Test Parameters

| Run Number | Feed Rate (cm$^3$/s) | Magnetic Field (tesla) | Matrix Material | Matrix Size (mm) | Matrix Diameter (mm) |
|---|---|---|---|---|---|
| 1 | 25 | 5 | Square Wire | 2.5 | 64 |
| 2 | 25 | 5 | Square Wire | 1.0 & 1.7 | 64 |
| 3 | 25 | 5 | Steel Wool | 110* | 64 |
| 4 | 25 | 5 | Square Wire | 2.5 | 64 |
| 5 | 25 | 5 | Square Wire | 1.0 & 1.7 | 64 |

*Microns, not millimeters

The test material was fed into the unit and flowed through the matrix in a 5 tesla magnetic field. No vibrator of the apparatus was used. The non-magnetic material exited the bottom of the unit while the magnetic fraction was held in the matrix. The current was ramped down to 0, reducing the magnetic field to 0. When the magnetic field was at 0, the matrix was flushed with water to remove any magnetic material that was still adhering to the matrix and internal ledges. It was necessary to preheat the magnetic separator unit and matrix material to prevent crystals from forming in the matrix. The recovered samples were diluted with water to remove any crystals that formed during the run and then filtered on 1 micron filter paper to remove insolubles.

In Run 1, a 2.5 mm square wire matrix was used.

In Run 2, a matrix composed of alternating pieces of 1.7 mm and 1.0 mm square wire material was used.

In Run 3, the non-magnetic product from Run 2 was used as the feed. The matrix was changed to a 110 micron steel wool.

In Run 4, a 2.5 mm square wire material was used as a matrix. The feed material included the +100 mesh insolubles, that had previously been screened out of the slurry in Runs 1, 2 and 3. The matrix plugged at the beginning of the run.

Run 5 included alternating pieces of a 1.7 mm and a 1.0 mm square wire material as the matrix.

The insoluble materials recovered from the various runs were analyzed by microscopic examination and chemical analysis. The results of these analyses are provided in Tables 17, 18 and 19.

TABLE 17

Analytical Test Results on an Insoluble Basis

| Description | Water insoluble, (%) Assay | Water insoluble, (%) Dist. | Water Soluble, (%) Assay | Water Soluble, (%) Dist. | Fe as Fe$_2$O$_3$, (%) Assay | Fe as Fe$_2$O$_3$, (%) Dist. | Ca as CaO, (%) Assay | Ca as CaO, (%) Dist. | Mg as MgO, (%) Assay | Mg as MgO, (%) Dist. | K as K$_2$O, (%) Assay | K as K$_2$O, (%) Dist. | Total S as S, (%) Assay | Total S as S, (%) Dist. |
|---|---|---|---|---|---|---|---|---|---|---|---|---|---|---|
| Run 1 Non Mag | | 45.5 | | | 1.660 | 38.9 | 13.60 | 46.0 | 10.10 | 39.5 | 3.60 | 46.2 | 0.159 | 23.3 |
| Run 1 Mag | | 54.5 | | | 2.180 | 61.1 | 13.30 | 54.0 | 12.90 | 60.5 | 3.50 | 53.8 | 0.436 | 76.7 |
| Run 2 Mag | | 64.4 | | | 1.870 | 69.6 | 13.20 | 63.8 | 12.60 | 73.1 | 3.75 | 68.5 | 0.332 | 71.6 |
| Run 3 Non Mag | | 19.9 | | | 1.320 | 15.2 | 13.50 | 20.2 | 6.89 | 12.4 | 3.43 | 19.4 | 0.161 | 10.7 |
| Run 3 Mag | | 15.7 | | | 1.670 | 15.2 | 13.50 | 16.0 | 10.20 | 14.5 | 2.70 | 12.1 | 0.334 | 17.6 |
| Run 4 | | | | | | | | | | | | | | |
| Run 5 Non Mag | | 79.8 | | | 1.470 | 68.0 | 19.40 | 82.0 | 7.74 | 77.1 | 2.70 | 79.6 | 0.363 | 51.0 |
| Run 5 Mag | | 20.2 | | | 2.740 | 32.0 | 16.80 | 18.0 | 9.11 | 22.9 | 2.74 | 20.4 | 1.380 | 49.0 |

TABLE 18

Cryo Filter Analytical Test Results on a Soda Ash Basis

| Description | Water insoluble, (%) Assay | Water insoluble, (%) Dist. | Water Soluble, (%) Assay | Water Soluble, (%) Dist. | Fe as Fe$_2$O$_3$, (%) Assay | Fe as Fe$_2$O$_3$, (%) Dist. | Ca as CaO, (%) Assay | Ca as CaO, (%) Dist. | Mg as MgO, (%) Assay | Mg as MgO, (%) Dist. | K as K$_2$O, (%) Assay | K as K$_2$O, (%) Dist. | Total S as S, (%) Assay | Total S as S, (%) Dist. |
|---|---|---|---|---|---|---|---|---|---|---|---|---|---|---|
| Run 1 Non Mag | 3.67 | 45.5 | 96.3 | 90.0 | 0.061 | 38.9 | 0.50 | 46.0 | 0.37 | 39.5 | 0.13 | 46.2 | 0.006 | 23.3 |
| Run 1 Mag | 29.09 | 54.5 | 70.9 | 10.0 | 0.634 | 61.1 | 3.87 | 54.0 | 3.75 | 60.5 | 1.02 | 53.8 | 0.127 | 76.7 |
| Run 2 Mag | 19.77 | 64.4 | 80.2 | 8.0 | 0.370 | 69.6 | 2.61 | 63.8 | 2.49 | 73.1 | 0.74 | 68.5 | 0.066 | 71.6 |
| Run 3 Non Mag | 1.64 | 19.9 | 98.4 | 90.0 | 0.022 | 15.2 | 0.22 | 20.2 | 0.11 | 12.4 | 0.06 | 19.4 | 0.003 | 10.7 |
| Run 3 Mag | 1.45 | 15.7 | 98.5 | 2.0 | 0.024 | 15.2 | 0.20 | 16.0 | 0.15 | 14.5 | 0.04 | 12.1 | 0.005 | 17.6 |

TABLE 19

Mineralogy of Test Samples

| Description | Mineralogy |
|---|---|
| Run 1 Non Mag | Essentially all fine tan shale, traces of searlesite, fine pyrite, etc. |
| Run 1 Mag | Essentially all fine tan shale, traces of searlesite, fine pyrite, etc. |
| Run 2 Mag | Essentially all fine tan shale, traces of searlesite, fine pyrite, etc. |
| Run 3 Non Mag | Essentially all fine tan shale, traces of searlesite, fine pyrite, etc. |
| Run 3 Mag | Essentially all fine tan shale, traces of searlesite, fine pyrite, etc. |
| Run 4 | |
| Run 5 Non Mag | Essentially all fine tan shale with a small amount of dark brown shale, traces of searlesite, fine pyrite, etc. Slight increase in pyrite compared to Run 1 Non Mag. |
| Run 5 Mag | Roughly 1:1 mixture of mostly fine shortite and fine tan shale and dark brown compact shale in roughly equal amounts. Possible increase of fine pyrite compared to other samples. Trace searlesite. |

These test results show that the reduction of impurities was obtained by use of wet high intensity magnetic separation. This eliminates or reduces the need to remove insoluble impurities by conventional means such as filtration from a saturated sodium carbonate solution. It also allows the removal of these impurities found in trona without the need to remove sodium carbonate monohydrate first to prevent loss of crystals in a filter cake or rejection stream.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for recovering a saline mineral from an ore containing said saline mineral and impurities which comprises shortite, pyrite or mixtures thereof, comprising calcining said saline mineral in an inert atmosphere and separating a first portion of impurities from said ore by magnetic separation, wherein said step of calcination produces carbon dioxide as a waste product and further comprising the step of recycling carbon dioxide produced by said step of calcination to provide said inert atmosphere.

2. A process, as claimed in claim 1, wherein said inert atmosphere further comprises a composition selected from the group consisting of nitrogen and water vapor.

3. A process, as claimed in claim 1, wherein said saline mineral is calcined at a temperature between about 43° C. and about 400° C.

4. A process, as claimed in claim 3, further comprising the step of subjecting said saline material to a preliminary magnetic field prior to said step of separating.

5. A process for the purification of a saline mineral in an ore comprising saline mineral and impurities, which comprises shortite, pyrite or mixtures thereof, by magnetic separation in a first magnetic field having positions of higher intensity and lower intensity, said process comprising pre-aligning said ore on a surface with respect to one or more of said positions of higher intensity of said first magnetic field prior to separation of said impurities; and separating a first portion of impurities from said ore by magnetic separation in said first magnetic field.

6. A process, as claimed in claim 5, wherein said surface comprises a belt and said ore is pre-aligned in the direction of travel of said belt.

7. A process, as claimed in claim 6, wherein said step of pre-aligning comprises subjecting said ore on said belt to a second magnetic field.

8. A process, as claimed in claim 6, wherein said step of pre-aligning comprises feeding said ore onto a portion of said belt which is aligned with said one or more higher intensity positions of said first magnetic field.

* * * * *